（12）United States Patent
Da et al.

(10) Patent No.: US 12,510,642 B2
(45) Date of Patent: Dec. 30, 2025

(54) SIGNAL PROCESSING METHODS AND SYSTEMS

(71) Applicant: WUHAN UNITED IMAGING HEALTHCARE CO., LTD., Hubei (CN)

(72) Inventors: Yihui Da, Wuhan (CN); Xin Liu, Wuhan (CN); Yaowen Zhang, Wuhan (CN)

(73) Assignee: WUHAN UNITED IMAGING HEALTHCARE CO., LTD., Wuhan (CN)

( * ) Notice: Subject to any disclaimer, the term of this patent is extended or adjusted under 35 U.S.C. 154(b) by 242 days.

(21) Appl. No.: 18/355,408

(22) Filed: Jul. 19, 2023

(65) Prior Publication Data

US 2023/0366998 A1 Nov. 16, 2023

Related U.S. Application Data

(63) Continuation of application No. PCT/CN2023/071993, filed on Jan. 13, 2023.

(30) Foreign Application Priority Data

Jan. 18, 2022 (CN) .......................... 202210052864.2
Apr. 24, 2022 (CN) .......................... 202210455203.4

(51) Int. Cl.
G01S 7/52 (2006.01)
A61B 8/00 (2006.01)
(Continued)

(52) U.S. Cl.
CPC ............ *G01S 7/52028* (2013.01); *A61B 8/06* (2013.01); *A61B 8/488* (2013.01); *A61B 8/5269* (2013.01);
(Continued)

(58) Field of Classification Search
CPC ............ G01S 7/52028; G01S 7/52077; G01S 15/8981; G01S 15/8988; G01S 15/8979;
(Continued)

(56) References Cited

U.S. PATENT DOCUMENTS 4,993,418 A 2/1991 Weaver et al.
5,016,641 A * 5/1991 Schwartz ............... A61B 8/488
600/455
(Continued)

FOREIGN PATENT DOCUMENTS

CN 101336830 A * 1/2009 ......... G01S 15/8979
CN 104783836 B 6/2017
(Continued)

OTHER PUBLICATIONS

Translation of CN101336830 (Year: 2009).*
(Continued)

*Primary Examiner* — Daniel Pihulic
(74) *Attorney, Agent, or Firm* — METIS IP LLC

(57) ABSTRACT

The present disclosure provides a signal processing method, comprising: obtaining a Doppler ultrasound signal; converting two adjacent groups of ultrasound signals of the Doppler ultrasound signal into frequency domain signals, and obtaining a result of the signal filling by filling missing ultrasound signals in a preset time period based on the frequency domain signals, the preset time period being an acquisition time interval of the two adjacent groups of ultrasound signals; and determining a target Doppler ultrasound signal based on the result of the signal filling.

18 Claims, 22 Drawing Sheets

(51) Int. Cl.
*A61B 8/06* (2006.01)
*G10L 21/0208* (2013.01)

(52) U.S. Cl.
CPC ...... *G01S 7/52077* (2013.01); *G10L 21/0208* (2013.01)

(58) Field of Classification Search
CPC ......... A61B 8/06; A61B 8/488; A61B 8/5269; A61B 8/5246; A61B 8/5207; G10L 21/0208
See application file for complete search history.

(56) References Cited

U.S. PATENT DOCUMENTS

| | | | | |
|---|---|---|---|---|
| 5,476,097 | A | * | 12/1995 | Robinson ............ G01S 15/8979 600/441 |
| 5,642,732 | A | * | 7/1997 | Wang ................. G01S 15/8979 600/453 |
| 5,928,153 | A | | 7/1999 | Chiang et al. |
| 2009/0012398 | A1 | * | 1/2009 | Zhang ................. G01S 7/52077 600/453 |
| 2022/0021970 | A1 | | 1/2022 | Vilermo et al. |
| 2023/0366998 | A1 | * | 11/2023 | Da ...................... G01S 7/52028 |
| 2023/0380409 | A1 | * | 11/2023 | Kim ..................... A01M 29/18 |
| 2024/0206851 | A1 | * | 6/2024 | Zhang ................. A61B 8/5223 |
| 2024/0397934 | A1 | * | 12/2024 | Kim ..................... A01M 29/18 |

FOREIGN PATENT DOCUMENTS

| | | | | |
|---|---|---|---|---|
| CN | 108852406 | A | | 11/2018 |
| CN | 109117698 | A | | 1/2019 |
| CN | 109378012 | A | | 2/2019 |
| CN | 110222781 | A | | 9/2019 |
| CN | 108037361 | B | | 2/2020 |
| CN | 111128215 | A | | 5/2020 |
| CN | 111388010 | A | | 7/2020 |
| CN | 111613239 | A | | 9/2020 |
| CN | 107688554 | B | | 9/2021 |
| CN | 114171045 | A | * | 3/2022 |
| CN | 114376606 | A | | 4/2022 |
| CN | 116973923 | A | * | 10/2023 ............... A61B 8/06 |
| WO | WO-2023138186 | A1 | * | 7/2023 ............... A61B 8/00 |
| WO | WO-2023138483 | A1 | * | 7/2023 ............... A61B 8/06 |

OTHER PUBLICATIONS

Translation of 114171045 (Year: 2022).*
First Office Action in Chinese Application No. 202210052864.2 mailed on Jan. 22, 2025, 14 pages.
International Search Report in PCT/CN2023/071993 mailed on May 31, 2023, 6 pages.
Zhang, Yu et al., Development of a Doppler Ultrasound Spectrum Analysis System Based on a Personal Computer, Chinese Journal of Scientific Instrument, 22(4): 365-368, 2001.
Aage Gronningsaeter et al., Blood Noise Reduction in Intravascular Ultrasound Imaging, IEEE Transactions on Ultrasonics, Ferroelectrics, and Frequency Control, 42(2): 200-209, 1995.

* cited by examiner

1200

```
Dividing the frequency domain data after
the noise reduction into a positive          ~ 1202
frequency portion and a negative frequency
portion
```

```
Generating a positive blood flow audio
signal corresponding to a positive blood
flow in a blood flow signal of the user by   ~ 1204
converting the positive frequency portion
into a time domain signal
```

```
Generating a negative blood flow audio
signal corresponding to a negative blood
flow in the blood flow signal of the user by ~ 1206
converting the negative frequency portion
into the time domain signal
```

FIG. 12

SIGNAL PROCESSING METHODS AND SYSTEMS

CROSS-REFERENCE TO RELATED APPLICATIONS

This application is a Continuation of International Application No. PCT/CN2023/071993, filed on Jan. 13, 2023, which claims priority of Chinese Patent Application No. 202210052864.2, filed on Jan. 18, 2022, and Chinese Patent Application No. 202210455203.4, filed on Apr. 24, 2022, the contents of which are hereby incorporated by reference to its entirety.

TECHNICAL FIELD

The present disclosure relates to the field of diagnostic imaging and, in particular, to a signal processing methods and systems.

BACKGROUND

A medical Doppler ultrasound may interact with a body in a non-invasive manner with the help of a medium to obtain an image and/or sound of a target internal tissue or organ to assist a physician in the diagnosis and treatment of a disease. Currently, the medical Doppler ultrasound usually has a large amount of background noise or usually loses signals, which affects detection effects.

Therefore, it is necessary to provide signal processing methods for obtaining a good quality ultrasound signal, thereby improving the detection effects.

SUMMARY

An aspect of an embodiment of the present disclosure provides a signal processing method. The signal processing method comprises: obtaining a Doppler ultrasound signal; converting two adjacent groups of ultrasound signals of the Doppler ultrasound signal into frequency domain signals, and obtaining a result of the signal filling by filling missing ultrasound signals in a preset time period based on the frequency domain signals, the preset time period being an acquisition time interval of the two adjacent groups of ultrasound signals; and determining a target Doppler ultrasound signal based on the result of the signal filling.

Another aspect of an embodiment of the present disclosure provides a signal processing system. The system comprises: an ultrasound signal acquisition module used to obtain a Doppler ultrasound signal; a signal processing module used to convert two adjacent groups of ultrasound signals of the Doppler ultrasound signal into frequency domain signals and obtain a result of the signal filling by filling missing ultrasound signals in a preset time period based on the frequency domain signals, the preset time period being an acquisition time interval of the two adjacent groups of ultrasound signals; and a determination module used to determine a target audio signal based on the result of the signal filling.

Another aspect of an embodiment of the present disclosure provides an image processing device comprising at least one storage medium and at least one processor, the at least one storage medium used to store computer instructions; the at least one processor used to execute the computer instructions to implement a signal processing method.

Another aspect of an embodiment of the present disclosure provides a non-transitory computer-readable storage medium, the storage medium storing computer instructions, and when the computer reads the computer instructions in the storage medium, the computer performs a signal processing method.

In some embodiments of the present disclosure, in a Doppler ultrasound signal obtained in a multi-synchronous mode, since there is a preset time interval for the emission of the ultrasound signal in the multi-synchronous mode, there are missing signals during that time interval. When the amount of missing data between two adjacent groups of ultrasound signals is large, a time span occupied by the missing data is also large, and the accuracy of filling the missing data directly in a time domain based on known data is low. In contrast, by converting the two adjacent groups of ultrasound signals in the Doppler ultrasound signal into frequency domain signals, the accuracy of filling the missing data based on known data can be improved by interpolating the signal based on the converted frequency domain data because a frequency span of the missing data in the frequency domain is small, which is beneficial to filling the missing data.

BRIEF DESCRIPTION OF THE DRAWINGS

The present disclosure is further illustrated in terms of exemplary embodiments. These exemplary embodiments are described in detail with reference to the drawings. These embodiments are not limited. In these embodiments, the same number represents the same structure, wherein:

FIG. 12 is a flowchart illustrating an exemplary process for generating a blood flow audio signal according to some embodiments of the present disclosure;

DETAILED DESCRIPTION

Figure 1:
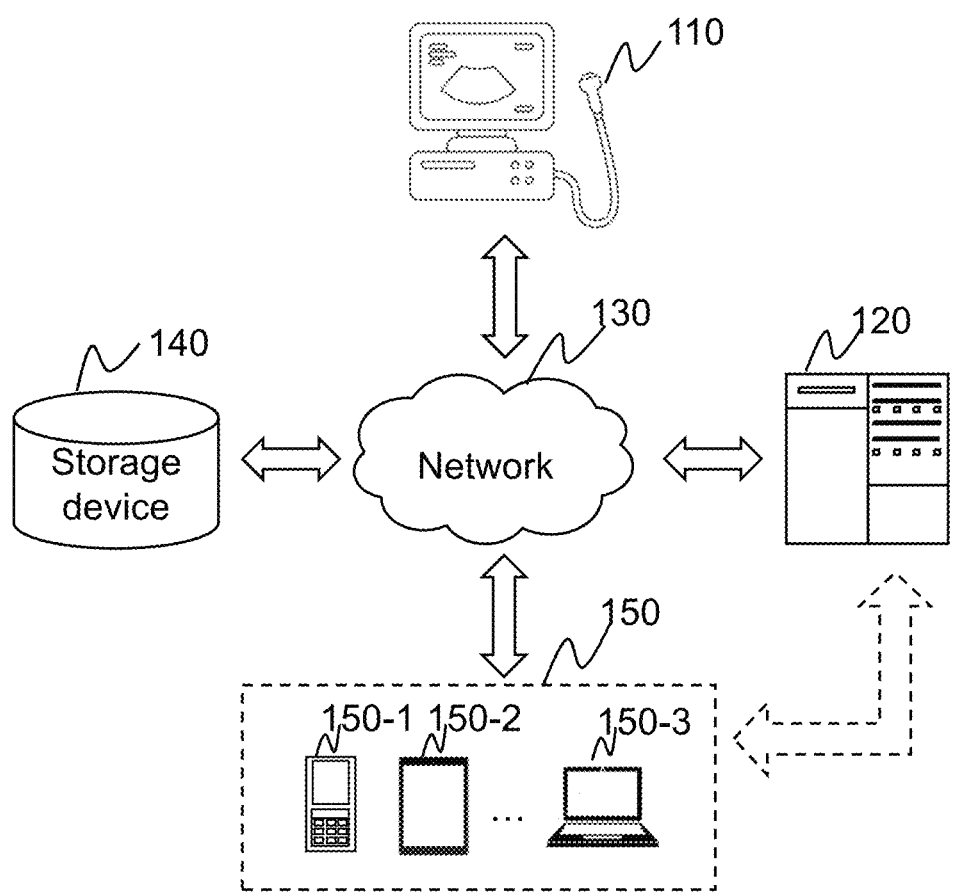
FIG. 1 is a schematic diagram illustrating an exemplary signal processing system according to some embodiments of the present disclosure.

The technical schemes of embodiments of the present disclosure will be more clearly described below, and the accompanying drawings need to be configured in the description of the embodiments will be briefly described below. Obviously, the drawings in the following description are merely some examples or embodiments of the present disclosure, and will be applied to other similar scenarios according to these accompanying drawings without paying creative labor. Unless obviously obtained from the context or the context illustrates otherwise, the same numeral in the drawings refers to the same structure or operation.

It will be understood that the term "system," "engine," "unit," "module," and/or "block" used herein are one method to distinguish different components, elements, parts, sections, or assembly of different levels in ascending order. However, the terms may be displaced by another expression if they achieve the same purpose.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

The flowcharts are used in present disclosure to illustrate the operations performed by the system according to the embodiment of the present disclosure. It should be understood that the preceding or following operations is not necessarily performed in order to accurately. Instead, the operations may be processed in reverse order or simultaneously. Moreover, one or more other operations may be added to the flowcharts. One or more operations may be removed from the flowcharts.

The Doppler ultrasound technique is an important tool for nondestructive diagnosis of vascular disease. The presence of vascular disease causes changes in the blood flow velocity waveform, such as changes in an average frequency or a maximum frequency curves of a Doppler signal. Currently, the medical Doppler ultrasound detection usually has a large amount of background noise. The background noise comes from a weak scattering of a detected tissue and a system noise. This noise usually accompanies the whole audio signal and is distributed in all frequency bands, which greatly reduces the audio signal-to-noise ratio and seriously interferes with an audio output of a blood flow signal.

Among the related techniques, the main methods for denoising an audio signal are a Wiener filtering, a spectral subtractive filtering, and a deep learning filtering, etc. Some of these methods require a large amount of data training to obtain the results, while others require a comprehensive evaluation of multiple time periods for analysis to obtain a current results.

An ultrasound imaging system may display a human tissue anatomy and a blood flow condition in real time through different imaging modes, thus bringing convenience to clinicians. Usually, the human tissue anatomy may be obtained through a B imaging mode, and the blood flow condition may be characterized by a Doppler blood flow signal obtained through a pulsed Doppler imaging mode or a color blood flow imaging mode.

In practical applications, there is sometimes a need to simultaneously demonstrate an image signal using multiple imaging modes, for example, to demonstrate the human tissue anatomy by B imaging mode while using the pulsed Doppler imaging mode to demonstrate the Doppler blood flow signal. However, during the imaging process, the time periods occupied by the pulsed Doppler imaging mode and the B imaging mode are different, so that the Doppler blood flow signal cannot be obtained during the time period of the B imaging mode, which leads to the absence of the Doppler blood flow signal. The absence of the signal is not conducive to the subsequent analysis of the blood flow condition.

In response to the above problems, the present disclosure proposes some improvement methods to improve at least some of them.

FIG. 1 is a schematic diagram illustrating an exemplary signal processing system according to some embodiments of the present disclosure.

As shown in FIG. 1, the signal processing system 100 may include an ultrasound device 110, a processing device 120, a network 130, a storage device 140, and a terminal 150. In some embodiments, the ultrasound device 110, the processing device 120, the network 130, the storage device 140, and the terminal 150 may be connected and/or in communication with each other via wired and/or wireless means.

The ultrasound device 110 may be configured to obtain ultrasound data of a target region on an object (a user). The ultrasound data may be used for imaging, e.g., a blood flow image, and may also be configured to output an audio signal, e.g., a blood flow sound. The blood flow image and the blood flow sound may be obtained by performing two different processes on the same ultrasound data, one process for ultrasound blood flow imaging and the other for ultrasound audio output. In some embodiments, the ultrasound device may use a difference in a physical property of ultrasound waves and the target region of the object in an acoustic property to obtain the ultrasound data of the target region of the object. The ultrasound data may be displayed and/or recorded in the form of data, a waveform, a curve or an image of a feature related to the target region of the object. By way of example, the ultrasound device may include one or more ultrasound probes for emitting ultrasound waves to the target region. The ultrasound waves produce different reflections and attenuation after passing through organs and tissues having different acoustic impedances and different attenuation properties, resulting in echoes that may be received by the one or more ultrasound probes. The ultrasound device may process (e.g., amplify, convert) and/or display the received echoes to generate the ultrasound data. In some embodiments, the ultrasound device may include a Doppler ultrasound device, a color Doppler ultrasound device, a cardiac ultrasound device, a three-dimensional ultrasound device, etc., or any combination thereof. In some embodiments, the ultrasound data may be a Doppler ultrasound signal.

In some embodiments, the ultrasound device 110 may send the Doppler ultrasound signal to the processing device 120, the storage device 140, and/or the terminal 150 for further processing via the network 130. For example, the Doppler ultrasound signal obtained by the ultrasound device may be data in a non-image form, and the data in the non-image form may be sent to the processing device 120 for generating an ultrasound spectrum image and/or a blood flow audio signal. As another example, the Doppler ultrasound signal may be stored in the storage device 140.

In some embodiments, the ultrasound device 110 may be used in combination with other imaging devices, for example, a computed tomography imaging device, a magnetic resonance imaging device, a nuclear medicine device, a thermal imaging device, a medical optical device, or any combination thereof.

The processing device 120 may process the data and/or information obtained from the ultrasound device 110, the storage device 140, and/or the terminal 150. For example, the processing device 120 may process the Doppler ultrasound signal obtained from the ultrasound device 110 and generate an audio signal of the target region. In some embodiments, the audio signal may be sent to the terminal 150 and output on one or more speakers in the terminal 150. In some embodiments, the processing device 120 may be a single server or a group of servers. The group of servers may be centralized or distributed. In some embodiments, the processing device 120 may be local or remote. For example, the processing device 120 may access information and/or data stored in the ultrasound device 110, the storage device 140, and/or the terminal 150 via the network 130. As another example, the processing device 120 may be directly connected to the ultrasound device 110, the storage device 140, and/or the terminal 150 to access the information and/or data stored thereon. As another example, the processing device 120 may be integrated in the ultrasound device 110. In some embodiments, the processing device 120 may be implemented on a cloud platform. By way of example only, the cloud platform may include a private cloud, a public cloud, a hybrid cloud, a community cloud, a distributed cloud, an internal cloud, a multi-cloud, etc., or any combination thereof.

In some embodiments, the processing device 120 may be a single processing device that communicates with the ultrasound device and processes the data received from the ultrasound device.

The network 130 may include any suitable network that may facilitate the exchange of information and/or data of the signal processing system 100. In some embodiments, one or more components of signal processing system 100 (e.g., the ultrasound device 110, the processing device 120, the storage device 140, or the terminal 150) may be connected and/or in communication with other components of the signal processing system 100 via the network 130. For example, the processing device 120 may obtain ultrasound data from the ultrasound device 110 via the network 130. As another example, the processing device 120 may obtain a user instruction from the terminal 150 via the network 130, and the instruction may be configured to instruct the ultrasound device 110 to perform an ultrasound detection. In some embodiments, the network 130 may include one or more network access points. For example, the network 130 may include a wired and/or wireless network access point, such as a base station and/or an Internet access point, through which one or more components of the signal processing system 100 may connect to the network 130 to exchange data and/or information.

The storage device 140 may store data and/or instructions. In some embodiments, the storage device 140 may store data obtained from the terminal 150 and/or the processing device 120. In some embodiments, the storage device 140 may store data and/or instructions that the processing device 120 may execute or use to execute the exemplary methods described in the present disclosure. In some embodiments, the storage device 140 may be implemented on a cloud platform. By way of example only, the cloud platform may include a private cloud, a public cloud, a hybrid cloud, a community cloud, a distributed cloud, an internal cloud, a multi-cloud, etc., or any combination thereof.

In some embodiments, the storage device 140 may be connected to the network 130 to communicate with one or more components of the signal processing system 100 (e.g., the processing device 120, the terminal 150, etc.). One or more components of the signal processing system 100 may access data or instructions stored in the storage device 140 via the network 130. In some embodiments, the storage device 140 may be directly connected to or in communication with one or more components of the signal processing system 100 (e.g., the processing device 120, the terminal 150, etc.). In some embodiments, the storage device 140 may be a part of the processing device 120.

The terminal 150 may include a mobile device 150-1, a tablet 150-2, a laptop 150-3, etc., or any combination thereof. In some embodiments, the terminal 150 may operate the ultrasound device 110 remotely. In some embodiments, the terminal 150 may operate the ultrasound device 110 via a wireless connection. In some embodiments, the terminal 150 may receive information and/or instructions input by a user and send the received information and/or instructions to the ultrasound device 110 or the processing device 120 via the network 130. In some embodiments, the terminal 150 may receive data and/or information from the processing device 120. In some embodiments, the terminal 150 may be part of the processing device 120. In some embodiments, the terminal 150 may be omitted.

Figure 2:
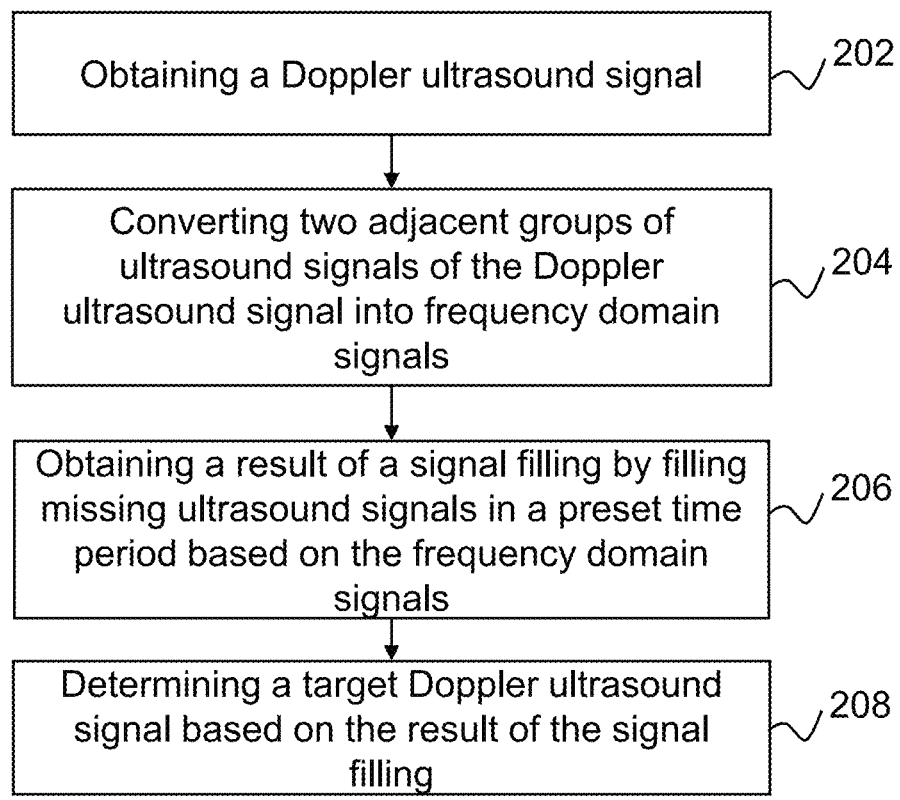
FIG. 2 is a flowchart illustrating an exemplary signal processing process according to some embodiments of the present disclosure.

FIG. 2 is a flowchart illustrating an exemplary signal processing process according to some embodiments of the present disclosure. In some embodiments, a process 200 may be executed by a processing device (e.g., the processing device 120). For example, the process 200 may be stored in a storage device (e.g., a self-contained storage unit of the processing device or an external storage device) in the form of a program or instructions, and the program or instructions, when executed, may implement the process 200. The process 200 may include the following operations.

In step 202, a Doppler ultrasound signal may be obtained. In some embodiments, step 202 may be performed by an ultrasound signal acquisition module 1410.

The Doppler ultrasound signal may be data that is received after a certain time delay after transmitting an ultrasound through an ultrasound probe to a user's tissue. The user may also be referred to as a target object, which may include, for example, a patient or other medical object (e.g., other animals such as experimental mice). The target object may also be part of the patient or other medical object, including an organ and/or tissue(e.g., a blood vessel, a heart, a lung, a rib cage, an abdominal cavity, etc.).

In some embodiments, the Doppler ultrasound signal may include a blood flow signal of the user and a noise signal. The blood flow signal may be a signal that reflects a blood flow within the user's tissue as detected by the Doppler ultrasound. The noise signal may be a signal that is generated due to a weak scattering of the user's tissue being detected, and a system, etc.

In some embodiments, the Doppler ultrasound signal may be an ultrasound signal after processing an original echo signal received by the ultrasound probe in a certain manner. For example, the processing device may receive the ultrasound echo signal returned from the user, and perform a beam synthesis on the received ultrasound echo signal to obtain a beam synthesized signal. The beam synthesis may refer to a processing (calculation) of the echo signal received by the probe to obtain a value corresponding to each point of the user tissue. Each point of the user tissue may be a discrete point corresponding to the user tissue described mathematically as a plurality of discrete points. The processing device may sum beam synthesized signals within a sampling frame set for a target position of the user. The target position may be a blood flow position within a blood vessel of the user, and the target position may be determined by marking on a corresponding ultrasound image of the user. The sampling frame may be configured to obtain the desired beam synthesis signals. The summation may be a mathematical superposition of a plurality of beam synthesis signals in the sampling frame, where echo signals sampled at all times are superimposed together. The sampling frame may be configured to obtain an echo signal at a position to be detected. The processing device may perform a wall filtering process on the summed signal to obtain the Doppler ultrasound signal. The wall filtering may be understood as a convolution operation on the summed signal. The wall filtering may be performed by a wall filter, and the present disclosure does not limit a type of wall filter. By the wall filtering, a low frequency signal in the signal may be filtered out and a high frequency signal may be retained, since the blood vessel wall vibrates very slowly and the low frequency signal may be considered to be generated by the vibration of the blood vessel wall and this part of the signal may be considered to be a non-blood flow signal.

In some embodiments, the processing device may obtain the Doppler ultrasound signal from a storage device, a database, or an ultrasound device, etc.

In step 204, two adjacent groups of ultrasound signals of the Doppler ultrasound signal may be converted into frequency domain signals. In some embodiments, the step 204 may be performed by a signal processing module 1420.

The ultrasound device (also referred to as an ultrasound instrument) may usually display the human tissue anatomy and blood flow condition in real time by different imaging modes. The human tissue anatomy may be obtained by the B imaging mode ("B mode" for short), and the blood flow condition may be characterized by a Doppler blood flow signal obtained by a pulsed Doppler imaging mode ("PW mode" for short) or a color blood flow imaging mode ("C mode" for short). In a medical ultrasound device, there is usually synchronization of PW mode with other multi-modes, such as a synchronization of B mode and PW mode, a synchronization of C mode and PW mode, and a triple synchronization of B mode, C mode, and PW mode. The multi-mode synchronization usually has a preset time period for transmitting signals in B mode or C mode at the PW mode, which also causes a large number of data blanks in the PW mode in a slow time direction, i.e., a large number of missing signals, due to the existence of a preset time interval for transmitting in the PW mode.

Figure 6:
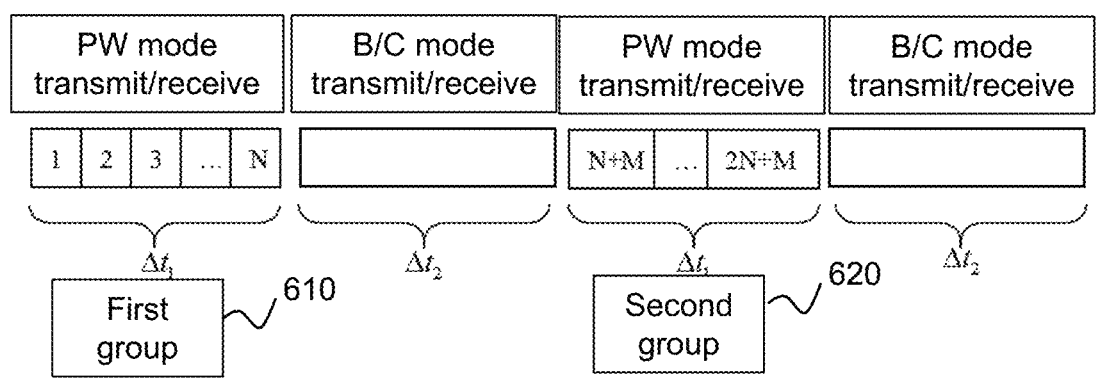
FIG. 6 is a schematic diagram illustrating an exemplary multi-modal synchronous ultrasound signal emission strategy according to some embodiments of the present disclosure.

Taking the synchronization of the PW mode with the B mode or the synchronization of the PW mode with the C mode as an example, please refer to FIG. 6. In a process of an ultrasound imaging, time periods occupied by the PW mode and the B mode or the C mode are different, and a time period occupied by the PW mode in FIG. 6 is $\Delta t_1$, and a time period occupied by the B mode or the C mode is $\Delta t_2$. Specifically, the PW mode transmits and receives N times, followed by the B/C mode transmits and receives M times, then the PW mode transmits and receives N times again, followed by the B/C mode transmits and receives, etc. The N transmissions and receptions of the PW mode may be defined as a group of ultrasonic signals, and the group of ultrasonic signals takes $\Delta t_1=N*PRI$, PRI (pulse repetition interval), which refers to a time interval of each emission of the PW mode. Here, the B/C mode transmitting and receiving time is usually designed as an integer multiple of PRI, which is denoted as $\Delta t_2=M*PRI$.

The two adjacent groups of ultrasound signals may refer to two groups of ultrasound signals that is inserted with a group of B mode/C mode between the two groups. For example, if a group of B/C modes is inserted between a group 1 ultrasound signals 610 and a group 2 ultrasound signals 620 as shown in FIG. 6, the two groups of ultrasound signals may be two adjacent groups of ultrasound signals.

There is a signal interval between two adjacent groups of ultrasound signals, and a time period corresponding to the signal interval is used for the B mode or C mode to obtain signals, i.e., a first type of Doppler blood flow signal is missing during the time period. The time period may be a preset time period. The user may set the preset time period according to a parameter transmitted/received by the B mode/C mode. The preset time period is an acquisition time interval of the two adjacent groups of ultrasound signals. When transmitting a pulsed Doppler signal, it may be sent at a fixed time interval according to the preset time period. The obtained Doppler ultrasound signal is a time domain signal, which may also be referred to as the first type of Doppler ultrasound signal. Obviously the greater a count M representing a count of transmissions and receptions of the B mode/C mode, the more data is missing from the first type of Doppler ultrasound signal. M pieces of missing data may be needed to be filled in order to complete a PW mode blood flow analysis and/or audio analysis. In some embodiments, N may be values such as 32, 64, 96, 128, etc., and M is usually greater than N/2, which also indicates that the count of missing data is usually large.

When the count of missing data between the two adjacent groups of ultrasound signals is large, a time span of the time occupied by the missing data is also large, and an accuracy of filling the missing data directly based on known data (e.g., the first group of ultrasound signals and the second group of ultrasound signals) is low. In contrast, if the two adjacent groups of ultrasound signals are converted into the frequency domain signals, the filling of the missing data is facilitated due to a small frequency span of the missing data in a frequency domain, so the processing device may convert the two adjacent groups of ultrasound signals in the Doppler ultrasound signal into the frequency domain signals and perform a signal interpolation process based on the converted frequency domain data, thereby improving the accuracy of filling the missing Doppler blood flow signal based on the known data.

In some embodiments, the processing device may use a preset conversion algorithm to convert the two adjacent groups of ultrasound signals to the frequency domain signals. The preset conversion algorithm may be a time-frequency conversion algorithm for converting a time domain signal to a frequency domain signal. The preset conversion algorithm may include any one of a Fourier transform, a fast Fourier change, a wavelet transform, a Laplace transform, or other types of time-frequency conversion algorithms, which are not limited.

In some embodiments, when converting the two groups of ultrasound signals, the two groups of ultrasound signals may be directly converted using the preset conversion algorithm to obtain corresponding frequency domain signals (to distinguish from frequency domain signals converted during an audio noise reduction processing later, the frequency domain signals involved in the signal filling may also be referred to as first frequency domain signals). A data pre-processing operation may also be performed on the two groups of ultrasound signals, and a pre-processed result is converted using the preset conversion algorithm to obtain corresponding frequency domain signals. The data pre-processing operation may include, but is not limited to, a data denoising, an excluding abnormal data and other processes, which are not limited. In the present disclosure, without causing confusion, the frequency domain signals obtained after conversion may also be referred to as a second type of Doppler ultrasound signal or second ultrasound signals.

In step 206, a result of the signal filling may be obtained by filling missing ultrasound signals in a preset time period based on the frequency domain signals. In some embodiments, the step 206 may be performed by the signal processing module 1420.

As mentioned above, the missing ultrasound signals in the preset time period are signals that are missing in the first group of ultrasound signals and the second group of ultrasound signals in a transmitting time interval. By way of example, a count of data points corresponding to the first group of ultrasound signals is N, and a count of data points corresponding to the second group of ultrasound signals is also N. The missing ultrasound signals in these two groups of ultrasound signals in the preset time period (e.g., $\Delta t_2$) are a count of signals transmitted/received in the B mode/C mode, i.e., M data points.

In some embodiments, the processing device may use various preset interpolation algorithms to fill in the missing ultrasound signals in the preset time period. The preset interpolation algorithms use the status of values taken at a finite count of points to estimate approximate values at other points. The data filling may be achieved, for example, by using a data fitting algorithm, or by an interpolation algorithm for interpolation; or it may be achieved by using a data replication. For example, a portion of data selected from the second ultrasound signals is copied directly, so that the filling is performed based on the copied data and original second ultrasound signals. The interpolation algorithm may be a variety of existing interpolation algorithms. Optionally, the preset interpolation algorithm may include, but is not limited to, a linear interpolation, a cubic spline interpolation, a Newtonian interpolation, a polynomial interpolation, etc. A corresponding interpolation algorithm may be selected based on a feature of the second ultrasound signals, an amount of missing data, etc.

Figure 3:
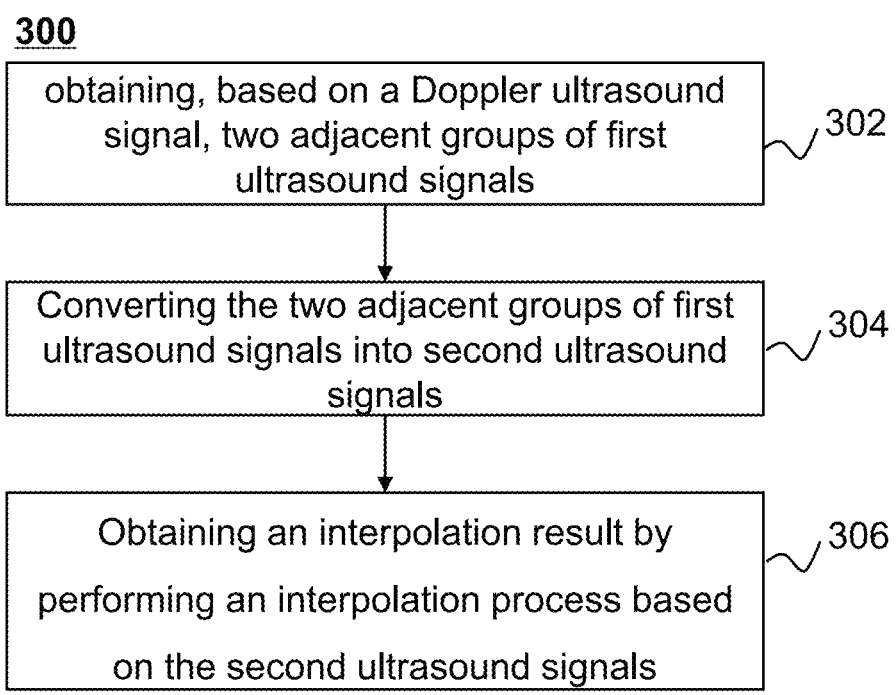
FIG. 3 is a flowchart illustrating an exemplary interpolation process according to some embodiments of the present disclosure.

For more information about the signal filling, please refer to FIG. 3 and its related description, which is not repeated here.

In some embodiments, by using the preset interpolation algorithm to interpolate the second ultrasound signals, the operation is simple and easy to implement, and the corresponding interpolation algorithm may be selected according to a data feature, thereby improving the accuracy and efficiency of the signal filling.

In step 208, a target Doppler ultrasound signal may be determined based on the result of the signal filling. In some embodiments, the step 208 may be performed by a determination module 1430.

The target Doppler ultrasound signal may be a desired ultrasound signal. In some embodiments, the processing device may determine the result of the signal filling (e.g., a complete Doppler ultrasound signal after the signal filling) as the target Doppler ultrasound signal.

In some embodiments, a blood flow image and/or an audio signal of the target object may be obtained based on the target Doppler ultrasound signal according to the user's analysis needs.

The blood flow image may be an image reflecting a blood flow of the target object. The audio signal may reflect a blood flow sound of the target object. The blood flow image may be used to observe the blood flow in the target object, and the audio signal may be used to listen to the blood flow sound of the target object, both of which complement each other to help the physician diagnose the patient's condition.

In some embodiments, the processing device may generate the blood flow image and the corresponding audio signal based on the complete Doppler ultrasound signal through a series of subsequent processing operations. The subsequent processing operations may include a Fourier transform of the complete Doppler ultrasound signal, taking a modal value, as well as a logarithmic compression, an image smoothing, a dynamic range, an automatic envelope for the generated blood flow image, and a signal noise reduction process for the audio, generating an inverse Fourier transform of the audio signal, adding a window overlay, etc. For more information about the signal noise reduction of the audio, please refer to FIGS. 10 to 12 of the present disclosure and the related description.

In some embodiments of the present disclosure, by converting the two adjacent groups of first ultrasound signals of the obtained Doppler ultrasound signal into the frequency domain signals when the ultrasound instrument is in the multi-synchronization mode, and filling the missing ultrasound signals based on the frequency domain signals in the preset time period, the filling of the missing data is facilitated due to the small frequency span of the missing data in the frequency domain, which in turn improves the accuracy of filling the missing Doppler blood flow signals based on the known data.

FIG. 3 is a flowchart illustrating an exemplary interpolation process according to some embodiments of the present disclosure. In some embodiments, process 300 may be executed by a processing device (e.g., the processing device 120). For example, the process 300 may be stored in a storage device (e.g., a self-contained storage unit of the processing device or an external storage device) in the form of a program or instructions, and the program or instructions, when executed, may implement process 300. The process 300 may include the following operations.

In step 302, two adjacent groups of first ultrasound signals may be obtained based on the Doppler ultrasound signal.

In some embodiments, the obtained Doppler ultrasound signal may include a plurality of PW mode ultrasound signals. In this case, the processing device may select two adjacent groups of first ultrasound signals from the plurality of PW mode ultrasound signals in a preset order. The preset order may be in chronological order (signal acquisition time sequence) from the first to the last, or may be two adjacent groups of first ultrasound signals that are randomly selected from a plurality of first ultrasound signals.

In step 304, the two adjacent groups of first ultrasound signals may be converted into second ultrasound signals.

In some embodiments, the processing device may convert the two adjacent groups of first ultrasound signals into the second ultrasound signals by the preset conversion algorithm. The converted second ultrasound signals may be the frequency domain signals.

In some embodiments, in realizing a conversion from a time domain to a frequency domain, a preset first window function may be configured to add a window to the two adjacent groups of first ultrasound signals, thus avoiding a spectral leakage during a spectrum analysis. The spectrum leakage herein refers to an interaction between spectral lines in a signal spectrum, while some false spectra of small amplitude appear at other frequency points on both sides of the spectral line. Exemplarily, the processing device may apply the first window function to the two adjacent groups of first ultrasound signals to determine windowed first ultrasound signals; and use the preset conversion algorithm to convert the windowed first ultrasound signals to obtain the second ultrasound signals.

The first window function may be a window function related to the two adjacent groups of first ultrasound signals. For example, if the two adjacent groups of first ultrasound signals contain 2N data points, the first window function may be a 2N order window function.

Exemplarily, as shown in FIG. 6, the two adjacent groups of first ultrasound signals ($\Delta t_1$) are denoted as g(t). g(t) contains 2N data points, which may be multiplied pointwise with the 2N order window function to obtain the first type of ultrasound signal $\bar{g}(t)$ after adding the window, as shown in equation (1):

$$\bar{g}(t)=g(t)H(t) \quad (1)$$

Where $\bar{g}(t)$ is the first ultrasound signals after adding the window; g(t) is the two adjacent groups of the first signals; and H(t) is the window function.

Taking the preset conversion algorithm as the Fourier transform algorithm as an example, the Fourier transform is configured to convert the first ultrasound signals after adding the window, and the second type of Doppler flow signal G(f) may be calculated according to equation (2).

$$G(f)=\int \bar{g}(t)e^{i2\pi ft}dt \quad (2)$$

Where $\pi$ denotes circumference, f denotes frequency, t denotes time, $i=\sqrt{-1}$ denotes imaginary number, and dt denotes integration over time t. At this time, G(f) contains 2N data points in the frequency domain, and a frequency range of the second ultrasound signals is $f \in [f_1, f_2]$, with $f_1$ denoting a lower limit of frequency and $f_2$ denoting an upper limit of frequency.

In this embodiment, the first ultrasound signals after the windowing may be obtained by using the preset first window function to add the window to the two adjacent groups of first ultrasound signals, and the second ultrasound signals may be obtained by using the preset conversion algorithm to convert the first ultrasound signals after the windowing. By windowing the two adjacent groups of first ultrasound signals, the first ultrasound signals may be divided into multiple small segments, and the preset conversion algorithm may be used to perform a time-frequency conversion on the windowed first ultrasound signals, thus ensuring that the converted frequency domain signals do not lose frequency information and improving the accuracy of the generated second ultrasound signals.

In step 306, an interpolation result may be obtained by performing an interpolation process based on the second ultrasound signals.

The interpolation process may refer to a determination of a signal (amplitude) corresponding to an inserted frequency point based on a mapping relationship between the frequency point and the signal (amplitude).

In some embodiments, the processing device may use a linear interpolation to insert new data points based on a count of data points of the missing signals based on frequencies and values corresponding to frequencies (complex numbers) of the existing data points of the second ultrasound signals. For more information about the process, please refer to FIG. 4, which is not repeated here.

The second ultrasound signals are the frequency domain signals obtained by transforming the first ultrasound signals, and the amount of data (a count of data points) of new second ultrasound signals generated by interpolating the second ultrasound signals is greater than the amount of data of the second ultrasound signals. Optionally, the new second ultrasound signals may be obtained by directly performing the data filling process on the second ultrasound signals, or may be obtained by first performing the data pre-processing operation on the second ultrasound signals and then performing the data filling process on the pre-processed result. Alternatively, other data processing operations may be performed to obtain a new second ultrasound blood flow signal, which is not limited.

The new second ultrasound signals obtained after performing the interpolation process are still in the frequency domain, and the processing device may inversely convert the interpolated frequency domain data to generate a result of the interpolation process.

The result of the interpolation process may refer to a time domain signal obtained by the inverse conversion of the filled frequency domain data.

In some embodiments, the processing device may perform the inverse conversion using an inverse conversion algorithm corresponding to the preset conversion algorithm for converting the first ultrasound signals to the second ultrasound signals to generate the result of the interpolation process. For example, assuming the frequency domain signal to which the first ultrasound signals are converted using the Fourier transform, the filled ultrasound signal may be converted to the time domain signal by an inverse Fourier transform.

Exemplarily, when the inverse conversion algorithm is the inverse Fourier transform, the new second ultrasound signals may be converted using equation (3) to generate an intermediate Doppler flow signal g*(t) corresponding to the new second ultrasound signals.

$$g^*(t) = \frac{1}{2\pi} \int \overline{G}(f) e^{-i2\pi ft} dt \qquad (3)$$

Where π denotes a ratio of a circumference of a circle to its diameter, f denotes a frequency, t denotes a time, $i=\sqrt{-1}$ denotes an imaginary number, and dt denotes an integration over time t. At this point, g*(t) contains 2N+M data points in the time domain.

In step 308, the missing ultrasound signals in the preset time period may be filled based on the interpolation result.

When filling the missing ultrasound signals in the preset time period, original two adjacent groups of the first ultrasound signals may be replaced directly with the converted time domain signal, i.e., the result of interpolation process. A portion of data corresponding to the preset time period may also be selected from the result of the interpolation process as the missing ultrasound signals, so that the filling of the missing ultrasound signals within the preset time period is achieved based on the selected portion of data combined with the original first ultrasound signals.

Figure 4:
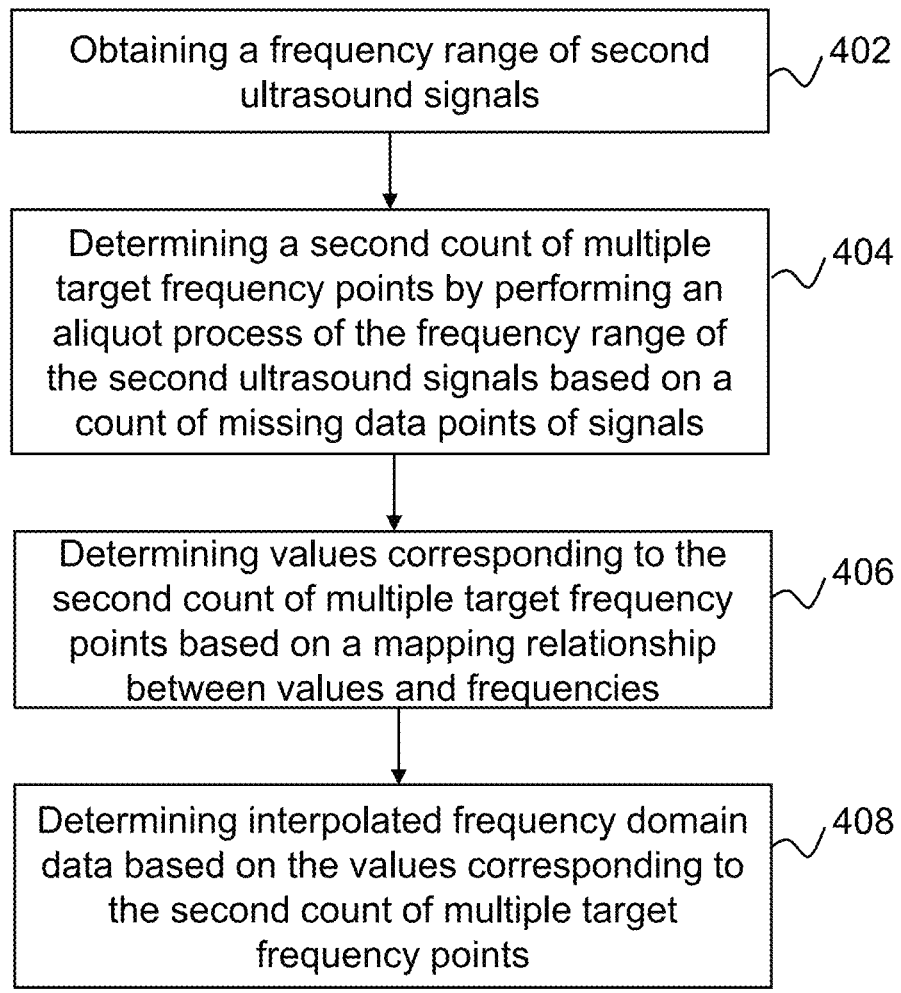
FIG. 4 is a flowchart illustrating an exemplary interpolation process according to some other embodiments of the present disclosure.

FIG. 4 is a flowchart illustrating an exemplary interpolation process according to some other embodiments of the present disclosure. In some embodiments, the process 400 may be executed by a processing device (e.g., the processing device 120). For example, the process 400 may be stored in a storage device (e.g., a self-contained storage unit of the processing device or an external storage device) in the form of a program or instructions, and the program or instructions, when executed, may implement process 400. The process 400 may include the following operations.

In step 402, a frequency range of the second ultrasound signals may be obtained.

As described above, the frequency range of the second ultrasound signals may be $f \in [f_1, f_2]$ after converting the two adjacent groups of first ultrasound signals into the frequency domain signals. The frequency range may be determined based on a result of converting the two adjacent groups of first ultrasound signals into the frequency domain signals.

The frequency range may include a first count of multiple initial frequency points. The count of initial frequency points is the same as a count of data points of the second ultrasound signals G(f). For example, if the second ultrasound signals G(f) contain 2N data points in the frequency domain, the count of initial frequency points may also be 2N, and each initial frequency point may have a corresponding value. The value may be a value (amplitude) of a signal value of a data point corresponding to the first ultrasound signals after conversion by the preset conversion algorithm. The first ultrasound signals are converted to obtain the second ultrasound signals, and the amounts of data before the conversion and after the conversion may be the same.

In step 404, a second count of multiple target frequency points may be determined by performing an aliquot process of the frequency range of the second ultrasound signals based on a count of missing data points of signals.

The count of missing data points of signals may be a count of missing ultrasound signals of the PW mode during the preset time interval between the first group of first ultrasound signals and the second group of first ultrasound signals. The aliquot process may refer to performing an aliquot process on the frequency range $f \in [f_1, f_2]$. For example, the range $[f_1, f_2]$ is 10 data points before the aliquot process and is expanded to 20 data points after the aliquot process. 10 data points are 10 aliquots of $[f_1, f_2]$ and 20 data points are 20 aliquots of $[f_1, f_2]$.

The target frequency points are frequency points in the frequency range after the aliquot process. The second count is a count of the target frequency points. For example, for the frequency range $f \in [f_1, f_2]$, 2N+M may be obtained by aliquoting $[f_1, f_2]$ by 2N+M−1 to obtain 2N+M target frequency points. Here, 2N+M is the second count. The second count is calculated by summing a count of the two adjacent groups of the first ultrasound signals and a count of the missing first ultrasound signals. As in FIG. 6, counts of the first group of first ultrasound signals and the second group of first ultrasound signals are both N. A amount of data obtained in a time period occupied by the intermediate B or C modes is M, i.e., a count of the missing first ultrasound signals is M. Therefore, the count of target frequency points is 2N+M, so that 2N+M target frequency points may be obtained by aliquoting the frequency range by 2N+M−1.

In step 406, values corresponding to the second count of multiple target frequency points may be determined based on a mapping relationship between values and frequencies.

Figure 7:
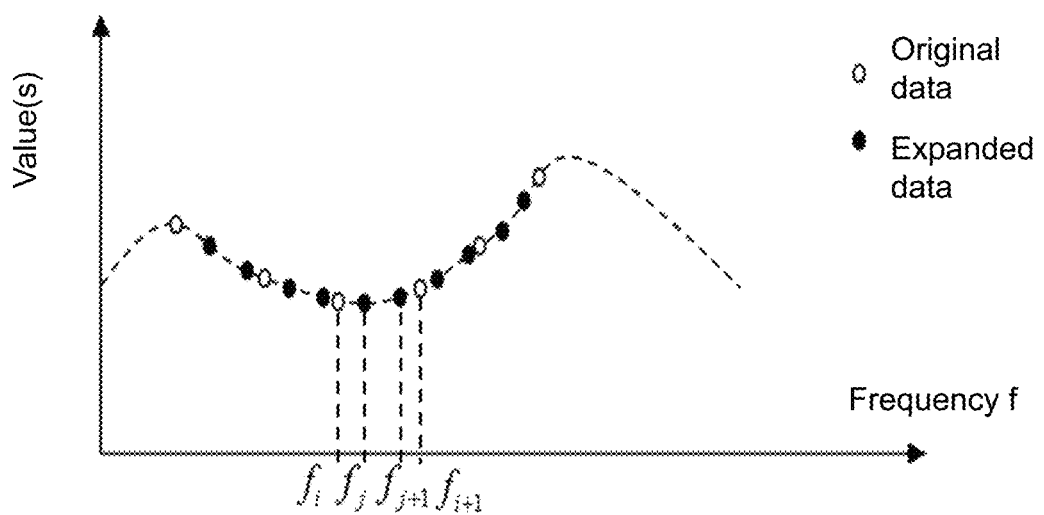
FIG. 7 is a schematic diagram illustrating an exemplary frequency domain interpolation process according to some embodiments of the present disclosure.

In some embodiments, the mapping relationship between the values and the frequency points may be represented by a coordinate system. As shown in FIG. 7, FIG. 7 is a schematic diagram illustrating an exemplary frequency domain interpolation process according to some embodiments of the present disclosure. Horizontal coordinates denote frequency points, a range of the frequency points is $f \in [f_1, f_2]$ (not shown), and $f_i$, $f_j$, $f_{i+1}$, and $f_{j+1}$ in the FIG. 7 denote target frequency points, respectively. Hollow circles denote target frequency points corresponding to original data, which correspond to initial frequency points, and solid circles denote expanded data, i.e., new frequency points inserted by interpolation. Vertical coordinates denote values corresponding to each target frequency point, which are complex values after the Fourier transform.

For each target frequency point, values (e.g., amplitudes) corresponding to 2N+M target frequency points may be obtained with the help of the linear interpolation according to the mapping relationship between G(f) and $f \in [f_1, f_2]$, denoted as $\overline{G}(f)$. As shown in FIG. 7, the hollow circles denote the second ultrasound signals, i.e., the known data, whose corresponding values are known, and the solid circles denote the new second ultrasound signals, i.e., the expanded data, whose corresponding values are unknown. For example, $f_i$, $f_{i+1}$ denote two adjacent initial frequency points corresponding to amplitudes (vertical coordinates) of $G(f_i)$ and $G(f_{i+1})$, from which the amplitude $G(f_j)$ corresponding to the target frequency point and the amplitude $G(f_{j+1})$ corresponding to the target frequency point $f_{j+1}$ may be calculated using the linear interpolation algorithm. Exemplarily, the specific calculation formula can be as shown in equations (4) and (5). All other amplitudes corresponding to the target frequency points may be calculated according to the same process.

$$G(f_j) = \frac{f_j - f_i}{f_{i+1} - f_i}[G(f_{i+1}) - G(f_i)] + G(f_i) \qquad (4)$$

$$G(f_{j+1}) = \frac{f_{j+1} - f_i}{f_{i+1} - f_i}[G(f_{i+1}) - G(f_i)] + G(f_i) \qquad (5)$$

In step 408, interpolated frequency domain data may be determined based on the values corresponding to the second count of multiple target frequency points.

After the amplitudes (values) corresponding to the 2N+M target frequency points are calculated separately using the above process, the original second ultrasound signals may be directly replaced by each target frequency point and the amplitudes corresponding to the target frequency points, and may be designated as the interpolated frequency domain data (which may also be called the new second ultrasound signals). It is also possible to select some of the target frequency points and the amplitude values corresponding to the target frequency points and combine them with the original second ultrasound signals, thereby generating the interpolated frequency domain data. For example, the processing device may select a portion of the 2N+M target frequency points and the corresponding amplitude values and replace a portion of the Doppler ultrasound signal data points in corresponding first ultrasound signals to generate the interpolated frequency domain data. For more information about the process, please refer to FIG. 5, which is not repeated here.

In this embodiment, by obtaining the frequency range of the second ultrasound signals, the frequency range is aliquoted according to the count of the missing signal points to obtain the second count of multiple target frequency points. For each target frequency point, the amplitude value corresponding to the target frequency point is calculated according to the mapping relationship between the initial frequency point and the amplitude value. According to each target frequency point and the amplitude value corresponding to the target frequency point, the interpolated frequency domain data is generated, which is simple and easy to implement. Because a span between two adjacent frequency points is small, it is also possible to accurately calculate the new second ultrasound signals.

Figure 5:
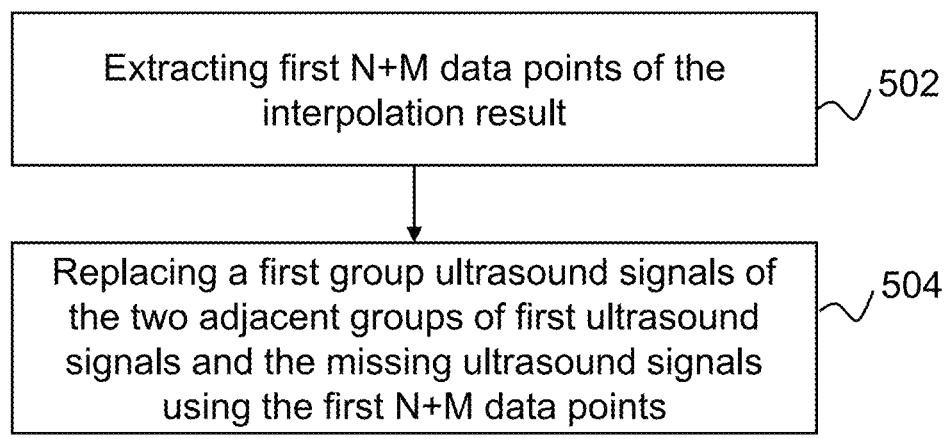
FIG. 5 is a flowchart illustrating an exemplary signal filling process according to some other embodiments of the present disclosure.

FIG. 5 is a flowchart illustrating an exemplary signal filling process according to some other embodiments of the present disclosure. In some embodiments, the process 500 may be executed by a processing device (e.g., the processing device 120). For example, the process 500 may be stored in a storage device (e.g., a self-contained storage unit of the processing device or an external storage device) in the form of a program or instructions, and the program or instructions, when executed, may implement process 500. The process 500 may include the following operations.

In step 502, first N+M data points of the interpolation result may be extracted.

As described in the above embodiment, for two adjacent groups of first ultrasound signals, the result of the interpolation process may include 2N+M data points, 2N corresponding to the first count, i.e., a group of first ultrasound signals includes N data points, and the amount of data for each group of first ultrasound signals is the same, then the two adjacent groups of first ultrasound signals are 2N data points. M is the count of the missing ultrasound signal points between the two groups of first ultrasound signals. For example, the preset time period is $\Delta t_2$, and the count of data points of the missing Doppler ultrasound signals within the preset time period $\Delta t_2$ is M. 2N+M corresponds to the second count, and 2N+M is the count of data points contained in the new second ultrasound signals after the interpolation process.

The first N+M data points correspond to a first group of ultrasonic signals and missing signals in the two adjacent groups of ultrasonic signals. The first N+M data points are obtained by filtering out data points that are within the time period $\Delta t_1$ corresponding to the first group of first ultrasound signals and within the preset time period $\Delta t_2$ time period from the result of interpolation process.

In step 504, a first group ultrasound signals of the two adjacent groups of first ultrasound signals and the missing ultrasound signals may be replaced using the first N+M data points.

As mentioned above, the first N data points correspond to the first group of ultrasound signals in the two adjacent groups of first ultrasound signals, and M data points correspond to the missing signals (the missing signals may be represented as zeros or placeholders or vacancies), and the filling of the missing signals is completed by using the first N+M data point replacements.

Exemplarily, based on the above embodiment, after generating the result of the interpolation process g*(t) corresponding to the new second ultrasound signals, the first N+M data in g*(t) may be replaced with the N first ultrasound signals of the kth group of the original two adjacent first ultrasound signals g(t), as well as filling the missing M first ultrasound signals. Specifically, referring to FIG. 6, FIG. 6 is a schematic diagram illustrating an exemplary multi-modal synchronous ultrasound signal emission strategy according to some embodiments of the present disclosure. There are 2N+M data in g*(t), and the two adjacent groups of first ultrasound signals in g(t). The first N+M data in g*(t) may be replaced with the N first ultrasound signals of the first group in g(t), as well as filling the missing M first ultrasound signals in the preset time period $\Delta t_2$.

In some embodiments, in addition to the process of directly extracting a portion of the data points for replacement from the result of the interpolation process described above, the processing device may also perform a weighting process based on the result of the interpolation process corresponding to the two adjacent groups of first ultrasound signals of a current iteration with the result of the interpolation process corresponding to the two adjacent groups of first ultrasound signals of a previous iteration, and extract the first N+M data points for replacement from the result of the weighting process. The second group of first ultrasound signals of the previous iteration is the same as the first group of ultrasound signals of the current iteration. For example, referring to FIG. 6, assuming that the next group of first ultrasound signals after a second preset time period $\Delta t_2$ (not shown in the figure) is a third group of first ultrasound signals, the two adjacent groups of first ultrasound signals of the previous iteration are group 1 and group 2, and the two adjacent groups of first ultrasound signals of the current iteration are group 2 and group 3.

Combining the analysis of the two adjacent groups of first ultrasound signals of the previous iteration and the current iteration, it can be seen that when the signal filling is performed, aa data basis of the signal interpolation of the previous iteration is the signals of groups 1 and 2, and a data basis of the signal interpolation of the current iteration is the signals of groups 2 and 3. And in the process of signal interpolation, the greater the amount of base data is, the more accurate the law of correlation of each signal point is, and the comprehensive consideration of the relationship between more data points may improve the accuracy of data interpolation.

The weighting process may add a weight to the result of the interpolation process of the previous iteration and the result of the difference process of the current iteration based on the actual situation. For example, if the contribution or value of the result of the interpolation process of the previous iteration is small, a weight of 0.1 may be assigned to the result of the interpolation process, and the result of the interpolation process of the current iteration has a weight of 0.9. After that, the interpolation results of the two iterations may be weighted and summed to determine the result of the weighting process.

In this embodiment, it is efficient to directly replace the original first ultrasound signals and fill the missing first ultrasound signals. And only signals corresponding to the preset time period are selected to fill in the missing first ultrasound signals, still retaining the original true acquisition of the second group of first ultrasound signals, and the accuracy of the signal filling is great. At the same time, the accuracy of the signal filling is further improved by weighting the results of signal interpolation of the previous and current iterations.

Figure 8:
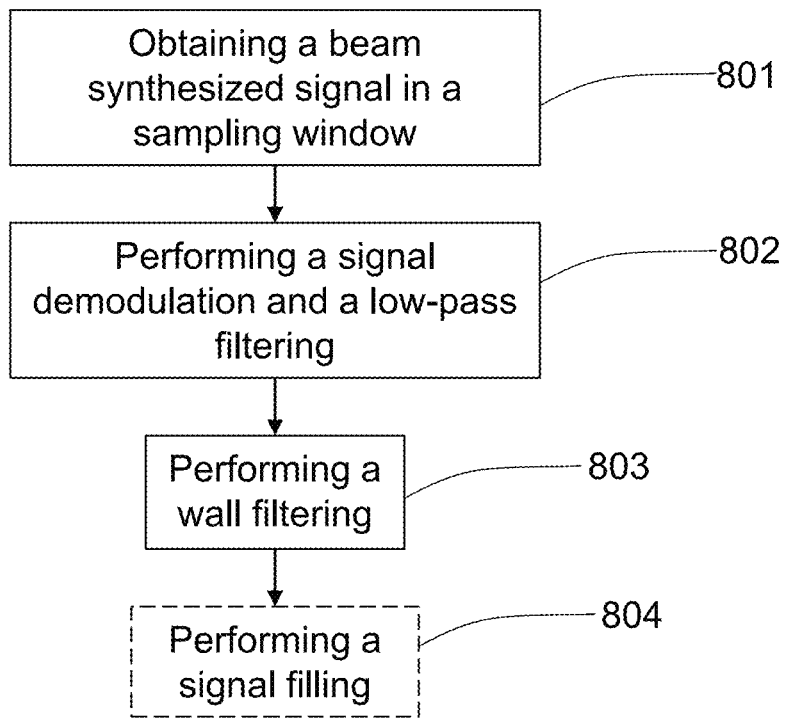
FIG. 8 is a schematic diagram illustrating an exemplary ultrasound detection process in PW mode according to some embodiments of the present disclosure.

FIG. 8 is a schematic diagram illustrating an exemplary ultrasound detection process in PW mode according to some embodiments of the present disclosure.

In step 801, a beam synthesized signal in a sampling window may be obtained.

Based on a user selection operation of a sampling window, the beam synthesized signal in the sampling window may be obtained.

In step 802, a signal demodulation and a low-pass filtering may be performed.

The beam synthesized signal is demodulated and low-pass filtered in a fast-time direction. The low-pass filter is usually selected as a recursive filter, i.e., an IIR filtering, and the fast-time direction refers to a time when the probe receives a period of pulses.

In step 803, a wall filtering may be performed.

Signals in the fast-time direction is summed, and the summed signal is wall filtered (e.g., a high-pass filtering), in a slow-time direction, where the slow-time direction is an emission interval time.

In step 804, a signal filling may be performed.

In the case where there are missing PW mode signals due to the multi-mode synchronization, the missing data may be filled. In some embodiments, the missing data may be filled by the signal filling method involved in the signal processing process disclosed in some embodiments of the present disclosure.

After the signal filling is completed, the user may obtain a patient's blood flow image and/or audio signal for analysis based on the actual situation (e.g., the diagnostic analysis needs of the patient). For example, the blood flow image may be obtained by performing a short-time Fourier transform on the filled data and then processing the short-time Fourier transformed signal using a series of image processing operations to obtain the final blood flow image. As another example, after the short-time Fourier transform of the filled data, the audio signal for characterizing a blood flow sound is obtained by a series of data processing operations, and the audio signal may be configured to play the blood flow sound in the PW mode through a speaker.

It should be noted that the above examples are for exemplary purposes only and are not intended to limit the scope of application of the Doppler ultrasound signal obtained after signal processing.

Figure 9:
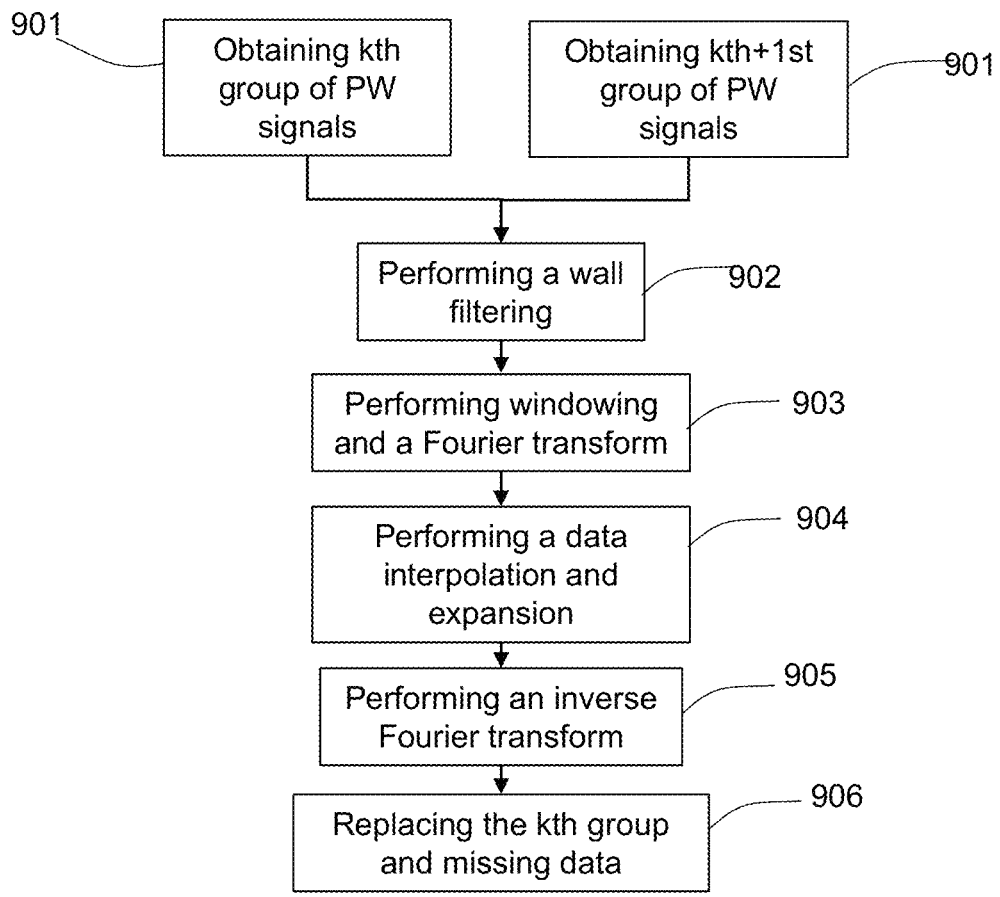
FIG. 9 is a flowchart illustrating an exemplary signal filling process according to some embodiments of the present disclosure.

FIG. 9 is a flowchart illustrating an exemplary signal filling process according to some embodiments of the present disclosure.

As shown in FIG. 9, the signal filling process may include:

In step 901, kth group of PW signals and kth+1st group of PW signals may be obtained.

The two adjacent groups of first ultrasound signals, i.e., the kth group of first ultrasound signals and the kth+1st group of first ultrasound signals, are selected.

In step 902, a wall filtering may be performed.

The wall filtering is performed on the two adjacent groups of Doppler blood flow signals of type I.

In step 903, windowing and a Fourier transform may be performed.

The two groups of first ultrasound signals are windowed and performed by the Fourier transform to obtain the second ultrasound signals.

In step 904, a data interpolation and expansion may be performed.

The second ultrasound signals are interpolated to obtain the new second ultrasound signals.

In step 905, an inverse Fourier transform may be performed.

The new second ultrasound signals may be processed by the inverse Fourier transform to obtain a result of the interpolation process.

In step 906, the kth group and missing data may be replaced.

The result of the interpolation process is used to replace the kth group of first ultrasound signals and the missing first ultrasound signals.

In this embodiment, because the first ultrasound signals are time-domain signals, when the amount of missing data between the two adjacent groups of first ultrasound signals is great, the time span of the time occupied by the missing data is also great, and thus the accuracy of filling the missing data based on the known data is low. In contrast, by converting the two groups of first ultrasound signals into the second ultrasound signals, the accuracy of filling the missing Doppler flow signals based on the known data is improved because the second ultrasound signals are in the frequency domain and the frequency span of the missing data in the frequency domain is small, thus facilitating the filling of the missing data.

Figure 10:
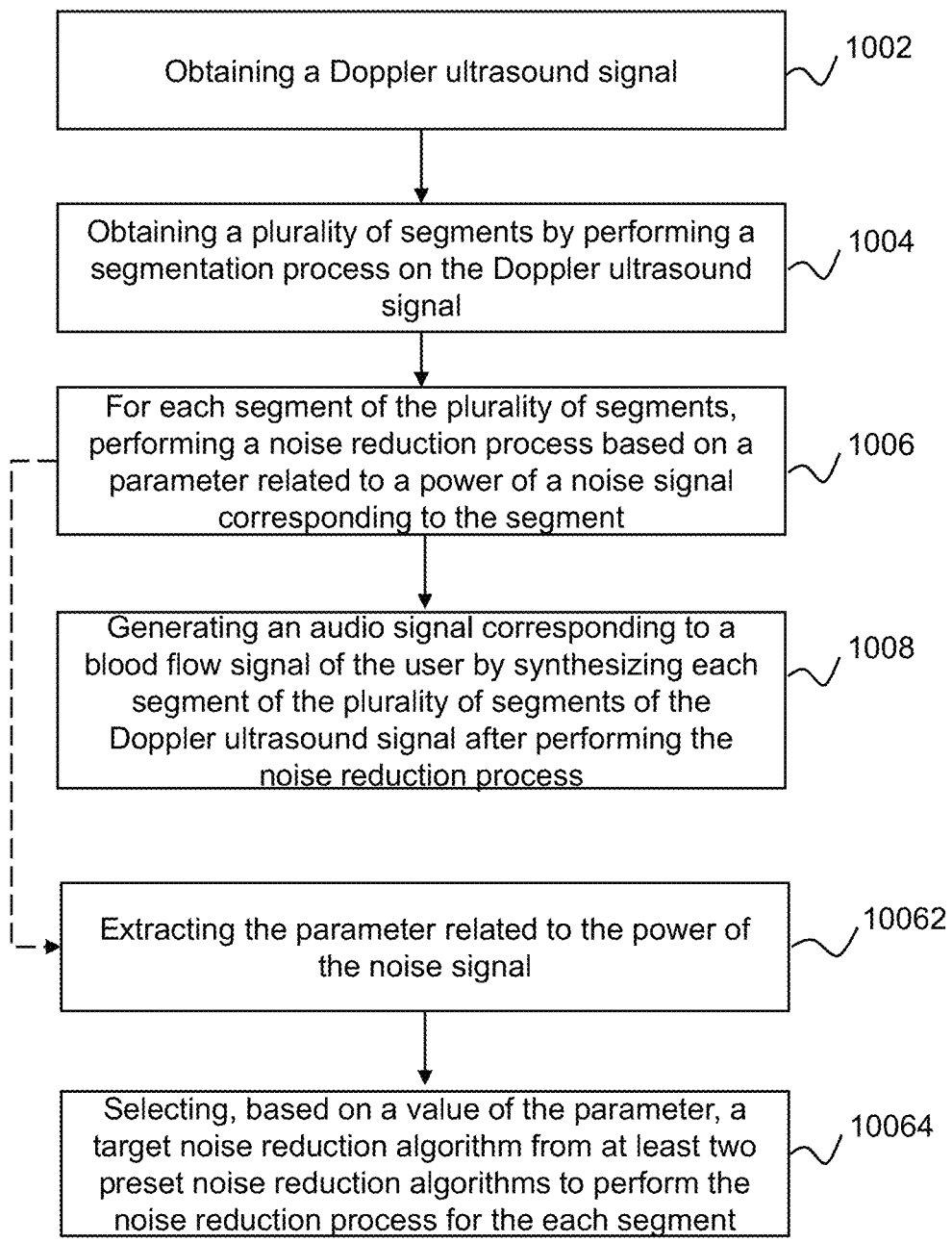
FIG. 10 is a flowchart illustrating an exemplary audio noise reduction process according to some embodiments of the present disclosure.

FIG. 10 is a flowchart illustrating an exemplary audio noise reduction process according to some embodiments of the present disclosure. In some embodiments, the process 1000 may be executed by a processing device (e.g., the processing device 120). For example, the process 1000 may be stored in a storage device (e.g., a self-contained storage unit of the processing device or an external storage device) in the form of a program or instructions, and the program or instructions, when executed, may implement the process 1000. The process 1000 may include the following operations.

In step 1002, a Doppler ultrasound signal may be obtained.

In some embodiments, the Doppler ultrasound signal may be obtained according to step 202 of FIG. 2 of the present disclosure. In some embodiments, the obtained Doppler ultrasound signal may be the same Doppler ultrasound signal obtained in step 202, or it may be another ultrasound signal. For example, it may be a Doppler ultrasound signal obtained at a different time period. The obtained Doppler ultrasound signal may be a complete ultrasound signal or an ultrasound signal with missing signals, and the present disclosure is not limited.

In some embodiments, the obtained Doppler ultrasound signal may be an ultrasound signal that has undergone a certain signal processing. For example, it may be a target Doppler ultrasound signal obtained after filling in accordance with the ultrasound signal filling process shown in some embodiments of the present disclosure. The complete Doppler ultrasound signal may include a blood flow signal and a noise signal of the user.

In some embodiments, the complete Doppler ultrasound signal after the signal filling may be stored to a storage device, a database, etc., and the processing device may obtain the Doppler ultrasound signal by reading from the storage device, the database, etc.

In some embodiments, the processing device may also obtain the Doppler ultrasound signal without missing signals, e.g., the Doppler ultrasound signal obtained in PW single mode for an audio noise reduction. The present disclosure does not limit the specific application of the disclosed technical solutions for the audio noise reduction.

In step 1004, a plurality of segments may be obtained by performing a segmentation process on the Doppler ultrasound signal.

The segmentation process may refer to a division of the Doppler ultrasound signal into multiple different time periods.

In some embodiments, the processing device may obtain a segment of the Doppler ultrasound signal corresponding to each time segment, by applying a second window function at each of the different time periods of the Doppler ultrasound signal. A plurality of segments of the Doppler ultrasound signal corresponding to the multiple different time periods may be obtained.

Exemplarily, the processing device may perform the segmentation process on the Doppler ultrasound signal by the means described in the following embodiments.

Figure 15:
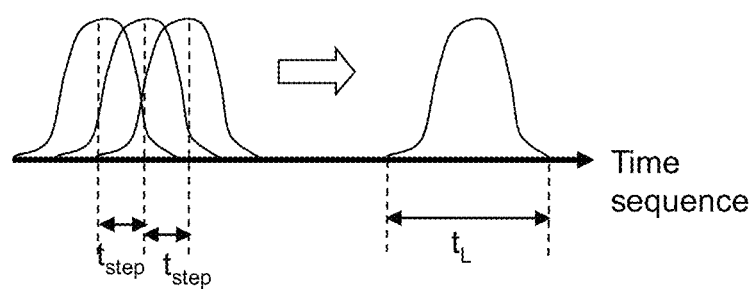
FIG. 15 is a schematic diagram illustrating exemplary process of windowing of a time signal by a second window function according to some embodiments of the present disclosure.

In some embodiments, the processing device may first demodulate the Doppler ultrasound signal to obtain a time signal p(t), at which point the Doppler ultrasound signal is a time signal. t is the time independent variable and the time signal p(t) belongs to the complex domain. Then a window is taken for the time signal p(t) by the second window function, and a window size of the second window function is equal to a count of data of a short-time Fourier transform. As shown in FIG. 15, FIG. 15 is a schematic diagram illustrating exemplary windowing of a time signal by a second window function according to some embodiments of the present disclosure, the second window function is noted as $H(t_L)$, the window size is $t_L$, the length of each move of the window (referred to as step) is $t_{step}$, and the process of taking a window may be denoted by equation (6).

$$g_n(t_n) = p_n(t_n) H(t_L) \quad (6)$$

Where $g_n(t_n)$ denotes Doppler ultrasound signal data from the nth window obtained by taking the window, n denotes the nth window with L data in each window, $t_n \in [(n-1)t_{step}, (n-1)t_{step}+t_L]$, n=1, 2, 3 . . . , N. The data in each window may be determined as a segment of the Doppler ultrasound signal.

In some embodiments, the window function used may be a Hanning window.

The segmentation process of the Doppler ultrasound signal ensures that a signal of a current moment is not mixed into a next moment (i.e., that the signal is real-time), so that the data of each time period is multiplied by the second window function for the segmentation process. In some embodiments, the second window function used may be a Gaussian function.

In some embodiments, the segmentation process is performed to obtain multiple Doppler ultrasound signals with a certain length of time.

In step 1006, for each segment of the plurality of segments, a noise reduction process may be performed based on a parameter related to a power of a noise signal corresponding to the segment.

The noise reduction process may refer to performing a digital processing on the Doppler ultrasound signal to remove or reduce a background noise in it.

In some embodiments, the processing device may perform the short-time Fourier transform on each segment of the Doppler ultrasound signal to obtain frequency domain data corresponding to each segment of the Doppler ultrasound signal. The processing device may perform the noise reduction process by performing the operations of steps 10062 to 10064 for each segment of the Doppler ultrasound signal.

In some embodiments, the process of performing the short-time Fourier transform on each segment of the Doppler ultrasound signal may be shown in equation (7) below.

$$G_n(f) = \int_{(n-1)t_{step}}^{(n-1)t_{step}+t_L} p_n(t_n) H(t_L) e^{-i2\pi f t_n} dt_n \quad (7)$$

Where $G_n(f)$ denotes the frequency domain data obtained by the Fourier transform of the nth segment Doppler ultrasound signal, and $p_n(t_n)H(t_L)$ denotes the nth window data obtained by taking the window.

Step 10062, the parameter related to the power of the noise signal may be extracted.

The power of the noise signal may be a square of a modal value of the frequency domain data after the Fourier transform of the Doppler ultrasound signal.

For the frequency domain data $G_n(f)$ after the Fourier transform, the modal value may be written as $|G_n(f)|$, and the square of the modal value is taken as the power of the noise signal, written as $|G_n(f)|^2$.

In some embodiments, the parameter related to the power of the noise signal may be obtained based on a calculation of an average value and a maximum value of the power of the noise signal. The average value of the power of the noise signal may be denoted as $V_n$, and the maximum value of the power of the noise signal may be denoted as $M_n$. $V_n$ is related to an intensity of the noise signal and may be configured to reflect the noise intensity of the noise signal. $M_n$ is related to an intensity of the blood flow signal and may be configured to reflect a power of the blood flow signal.

In some embodiments, the processing device may determine the parameter related to the power of the noise signal based on a size, a proportional relationship, or a calculated function value between the average and maximum values of the power of the noise signal as described.

For more information about the determining the parameter, please refer to FIG. 3 and its related description, which is not repeated here.

In step 10064, a target noise reduction algorithm may be selected from at least two preset noise reduction algorithms, based on a value of the parameter, to perform the noise reduction process for the each segment.

In some embodiments, a threshold of the parameter related to the power of the noise signal may be preset, and the target noise reduction algorithm may be selected from at least two preset noise reduction algorithms based on a size relationship between the value of the parameter and the preset threshold of the parameter. The different preset noise reduction algorithms may be configured to remove power parameters of different weights from the frequency domain data, respectively.

In some embodiments, the processing device may select a first noise reduction algorithm of the at least two preset noise reduction algorithms in response to the value of the parameter (e.g., a value of relevant parameters) being greater than the threshold. When the value of the parameter is greater than the threshold, it indicates that there is a blood flow sound in the Doppler ultrasound signal and the power of the blood flow sound is much greater than the power of the noise signal, at which point a denoised signal may be obtained directly. For example, the power of the noise signal is subtracted from an average value of the noise signal to obtain the denoised signal. Exemplarily, the noise reduction process using the first noise reduction algorithm may be shown in equation (8) below.

$$\overline{G}_n(f)=|G_n(f)|^2-V_n \quad (8)$$

Where $\overline{G}_n(f)$ denotes the denoised signal, $|G_n(f)|^2$ denotes the power of the noise signal, and $V_n$ denotes the average value of the noise signal.

In some embodiments, the processing device may select a second noise reduction algorithm from the at least two preset noise reduction algorithms in response to the value of the parameter being less than or equal to the threshold. The value of the parameter is less than or equal to the threshold, which indicates the presence of the blood flow sound in the Doppler ultrasound signal, but the power of the blood flow sound is close to the power of the noise. The denoised signal may be obtained by subtracting the power of the noise signal from the average value of the noise reduction signal, which differs from the first noise reduction algorithm in that the second noise reduction algorithm includes at least one different noise reduction parameter than the first noise reduction algorithm. For example, a weight of the average value of the noise signal in the first noise reduction algorithm is different from a weight of the average value of the noise signal in the second noise reduction algorithm. A noise reduction parameter may refer to a weight of the average value of the noise signal in the noise reduction algorithm. Exemplarily, the noise reduction process using the second noise reduction algorithm may be shown in equation (9) below.

$$\overline{G}_n(f)=|G_n(f)|^2-yV_n \quad (9)$$

Where $\overline{G}_n(f)$ denotes the denoised signal, $|G_n(f)|^2$ denotes the power of the noise signal, $V_n$ denotes the average value of the noise signal, and y denotes the weight of the average value of the noise signal, and the value range of y may be set empirically, e.g., y∈[0.01,0.1]. It can be understood that for the first noise reduction algorithm, a weighting factor of the average power of the noise signal is 1.

The first noise reduction algorithm and the second noise reduction algorithm are used to remove the first power parameter with a different weight from the frequency domain data, respectively. It can be understood that the at least two preset noise reduction algorithms may also include a third noise reduction algorithm, a fourth noise reduction algorithm, etc. The third noise reduction algorithm and the fourth noise reduction algorithm may also be used for the noise reduction process and are not exemplified here.

In some embodiments, the processing device may determine whether a calculated result of the noise reduction algorithm is less than zero, and when it is less than zero, the calculated result of the noise reduction algorithm may be equal to zero because the mode value cannot be less than zero.

After the noise reduction process by the noise reduction algorithm, the processing device may obtain a frequency domain signal after the noise reduction process based on the result of the noise reduction process and a phase signal corresponding to the mode value of the frequency domain data. The phase signal corresponding to the modal value may be denoted as angle[$G_n(f)$], and the phase signal may be obtained together with the modal value of the frequency domain data after the Fourier transform.

Exemplarily, the obtained frequency domain data after the noise reduction may be denoted by the following equation (10).

$$G^*_n(f)=\sqrt{\overline{G_n(f)}}e^{angle[G_n(f)]i} \quad (10)$$

Where $G^*_n(f)$ denotes the frequency domain data after the noise reduction, and angle[$G_n(f)$] denotes the phase signal.

In step 1008, an audio signal corresponding to a blood flow signal of the user may be generated by synthesizing each segment of the plurality of segments of the Doppler ultrasound signal after performing the noise reduction process.

Since a blood flow direction may be divided into a positive and a negative direction when the Doppler ultrasound detects the blood flow, with the positive direction indicating the blood flow toward the probe and the negative direction indicating the blood flow away from the probe, this phenomenon is also reflected in the frequency domain data. For example, in the frequency domain data after the noise reduction, a positive frequency component indicates the positive blood flow; a negative frequency component indicates the negative blood flow, so $G^*_n(f)$ may be divided into two parts, a positive frequency component $G_n^+(f)$ and a negative frequency component $G_n^-(f)$, which may be divided in a way that is already known and is not repeated here. It is also possible to differentiate the blood flow direction in audio, for example, by playing the positive and negative blood flow in different channels.

In some embodiments, the processing device may take conjugates $\overline{G_n^+}(f)$ and $\overline{G_n^-}(f)$ of $G_n^+(f)$ and $G_n^-(f)$, respectively, and re-obtain the positive and negative frequency components, consisting of the original positive and negative frequencies and their respective conjugates. Exemplarily, this may be denoted by the following equations (11) and (12).

$$W_n^+(f)=[G_n^+(f),\overline{G_n^+}(f)] \quad (11)$$

$$W_n^-(f)=[G_n^-(f),\overline{G_n^-}(f)] \quad (12)$$

Where $W_n^+(f)$ denotes the positive frequency component and $W_n^-(f)$ denotes the negative frequency component. Both positive and negative frequency data are of the same length as the original data $G^*_n(f)$, respectively.

After that, the processing device may perform the inverse Fourier transform on the obtained positive and negative frequency components, respectively, and multiply them by the window function. The process may be denoted by the following equations (13) and (14).

$$g_n^+(t_n) = \frac{1}{2\pi}H(t_L)\int W_n^+(f)e^{i2\pi ft_n}df \quad (13)$$

$$g_n^-(t_n) = \frac{1}{2\pi}H(t_L)\int W_n^-(f)e^{i2\pi ft_n}df \quad (14)$$

Where $g_n^+(t_n)$ denotes a result obtained by performing the inverse Fourier transform on the positive frequency components and multiplying it by the window function, $g_n^-(t_n)$ denotes a result obtained by performing the inverse Fourier transform on the negative frequency component and multiplying it by the window function, and $H(t_L)$ denotes the window function. The window function is the same as the one used for segmenting the Doppler ultrasound signal.

The processing device may then sequentially superimpose a positive blood flow audio signal corresponding to each segment of the Doppler ultrasound signal in the time domain to generate a continuous positive blood flow audio signal in the time domain. For example, the processing device may accumulate the windows of the window function in steps to obtain an audio output in both positive and negative directions. Exemplarily, the process may be denoted by the following equation (15).

$$g^+(t) = \frac{1}{\sum [H(t_L)]^2} \sum_{l=1}^{L} g_n^+(t_n^l) \qquad (15)$$

Where $g^+(t)$ denotes the generated continuous positive blood flow audio signal in the time domain, and $\Sigma[H(t_L)]^2$ denotes a sum of squares over the window function, $t_n \in [(n-1)t_{step}, (n-1)t_{step}+t_L]$, $n=1, 2, 3 \ldots N$. The sum of squares may refer to the summation of the same moments. For easy understanding, combined with the example, when $n=1,2,3$, $L=6$, step=3, $g^+(t)$ may contain 12 time points, so it may be written as a 12-dimensional vector, which may be denoted by the following equation (16).

$$g^+(t) = \frac{1}{\sum [H(t_L)]^2} [g_1^+(t_1^1), g_1^+(t_1^2), g_1^+(t_1^3), \qquad (16)$$

$$g_1^+(t_1^4) + g_2^+(t_2^1), g_1^+(t_1^5) + g_2^+(t_2^2), g_1^+(t_1^6) + g_2^+(t_2^3), g_2^+(t_2^4) + g_3^+(t_3^1),$$

$$g_2^+(t_2^5) + g_3^+(t_3^2), g_2^+(t_2^6) + g_3^+(t_3^3), g_3^+(t_3^4), g_3^+(t_3^5), g_3^+(t_3^6)]$$

In some embodiments, the processing device may also superimpose negative blood flow audio signals corresponding to each segment of the Doppler ultrasound signal sequentially in the time domain to generate a continuous negative blood flow audio signal in the time domain. This process may be denoted by the following equation (17).

$$g^-(t) = \frac{1}{\sum [H(t_L)]^2} \sum_{l=1}^{L} g_n^-(t_n^l) \qquad (17)$$

Where $g^-(t)$ denotes the generated continuous negative blood flow audio signal in the time domain, and $\Sigma[H(t_L)]^2$ denotes a sum of squares over the window function, $t_n \in [(n-1)t_{step}, (n-1)t_{step}+t_L]$, $n=1, 2, 3 \ldots, N$. Similarly when $n=1, 2, 3$, $L=6$ and step=3, $g^-(t)$ may contain 12 time points and therefore may also be written as a 12-dimensional vector, which may be denoted by the following equation (18).

$$g^-(t) = \frac{1}{\sum [H(t_L)]^2} [g_1^-(t_1^1), g_1^-(t_1^2), g_1^-(t_1^3), \qquad (18)$$

$$g_1^-(t_1^4) + g_2^-(t_2^1), g_1^-(t_1^5) + g_2^-(t_2^2), g_1^-(t_1^6) + g_2^-(t_2^3), g_2^-(t_2^4) + g_3^-(t_3^1),$$

$$g_2^-(t_2^5) + g_3^-(t_3^2), g_2^-(t_2^6) + g_3^-(t_3^3), g_3^-(t_3^4), g_3^-(t_3^5), g_3^-(t_3^6)]$$

While generating an audio signal corresponding to the user's blood flow signal, the processing device may also generate a blood flow image based on each segment of the Doppler ultrasound signal. For more information about the generating the blood flow image, please refer to other parts of the present disclosure, for example, in step 208, which is not repeated here.

In some embodiments of the present disclosure, the power of the noise signal in the Doppler ultrasound signal is judged, which enables a real-time filtering of the audio output of the Doppler ultrasound detection without a prior estimation of the background noise (unknown noise), without a large amount of sample training (real-time denoising), and without a regression analysis. The process is simple and easy to implement, thereby greatly reducing the background noise, and preserving well the useful audio signal. At the same time, the method is computationally simple, takes very little time, and does not affect the output speed of audio.

Figure 16:
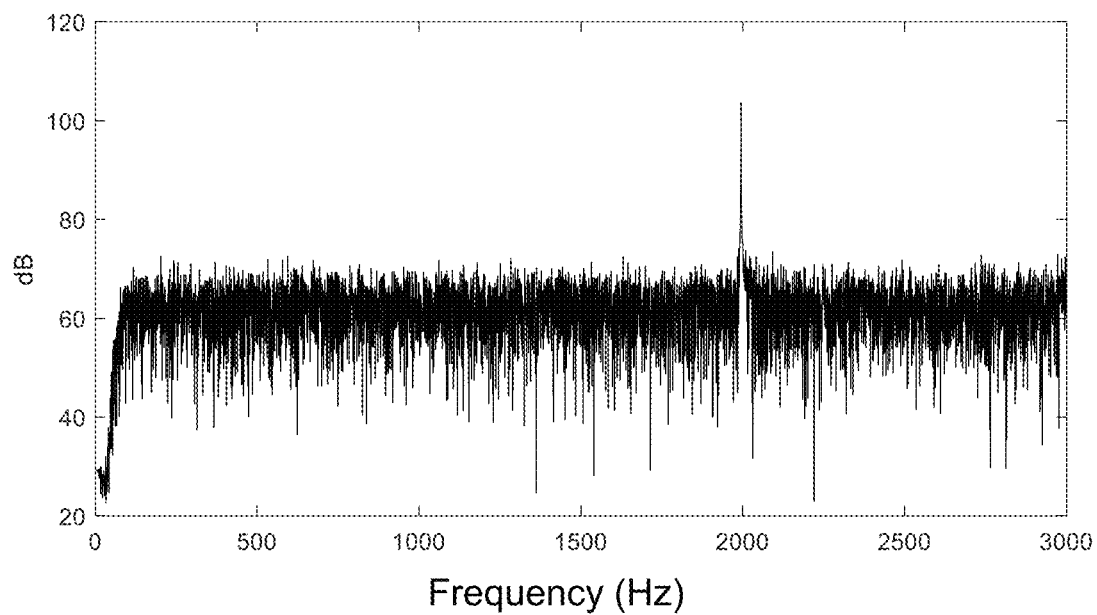
FIG. 16 is a schematic diagram illustrating an un-denoised audio signal according to some embodiments of the present disclosure.
Figure 17:
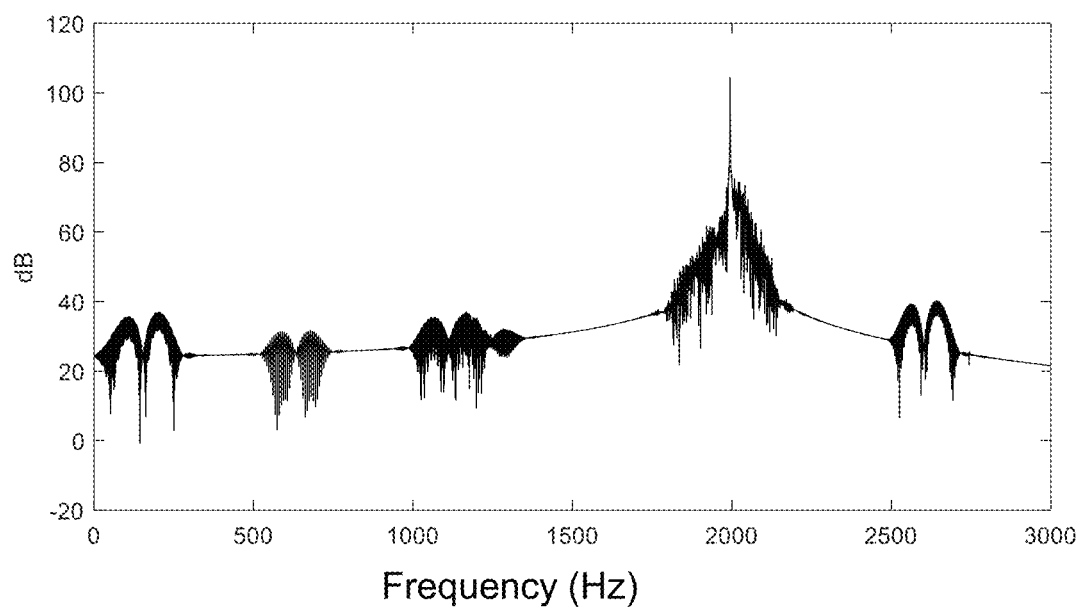
FIG. 17 is a schematic diagram illustrating an exemplary audio output signal after signal processing according to some embodiments of the present disclosure.

In some embodiments, the technical solution disclosed in embodiments of the present disclosure may improve an original signal-to-noise ratio of 37.65 dB to about 55.41 dB by testing on a single frequency signal. To verify the effectiveness of the noise reduction process disclosed in the embodiments of the present disclosure, an audio output signal of a single frequency is processed and the signal-to-noise ratio after denoising is calculated, and exemplarily the signal-to-noise ratio may be calculated as shown in equation (19) below.

$$SNR = 20 \log_{10}^{[max[g(t)]/C]} \qquad (19)$$

Where $$C = \frac{1}{m} \sum_{h=1}^{m} g(t_h),$$

m denotes a count of extreme values in g(t), $g(t_h)$ denotes an extreme value, and max[g(t)] denotes a maximum value. FIG. 16 is a schematic diagram illustrating an un-denoised audio signal according to some embodiments of the present disclosure, exemplified in FIG. 16 is a frequency domain diagram of a single frequency audio output signal, with the horizontal coordinate being the frequency in Hz and the vertical coordinate dB=20 $\log_{10}^{g(t)}$, at which time SNR=37.65 dB. Using the audio noise processing process disclosed in the present disclosure, it is possible to obtain FIG. 17. FIG. 17 is a schematic diagram illustrating an exemplary audio output signal after signal processing according to some embodiments of the present disclosure, where the SNR=55.41 dB. It is clear that the signal processing process disclosed in the embodiments of the present disclosure can improve the signal-to-noise ratio of the audio signal by about 17 dB and effectively remove the background noise from the audio signal.

Figure 18:
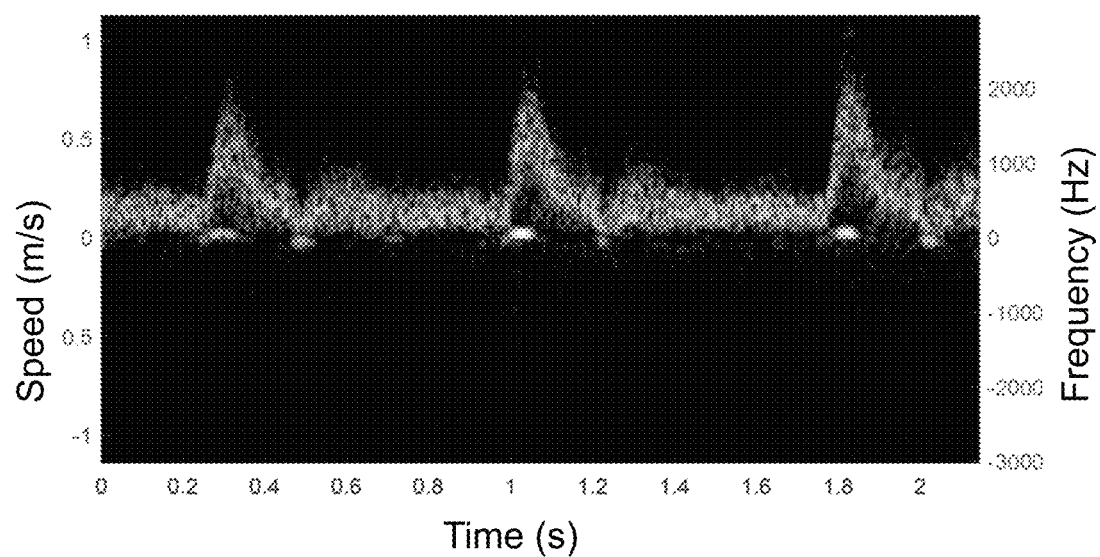
FIG. 18 is a schematic diagram illustrating an exemplary image of a carotid artery blood flow according to some embodiments of the present disclosure.
Figure 19:
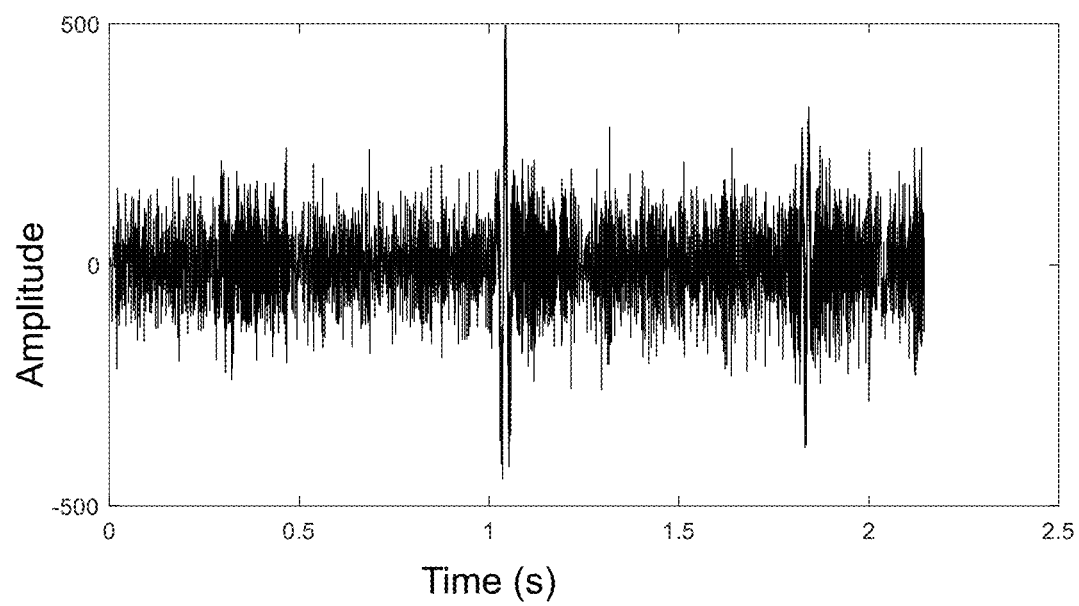
FIG. 19 is a schematic diagram illustrating an exemplary un-denoised carotid positive blood flow audio signal according to some embodiments of the present disclosure.
Figure 20:
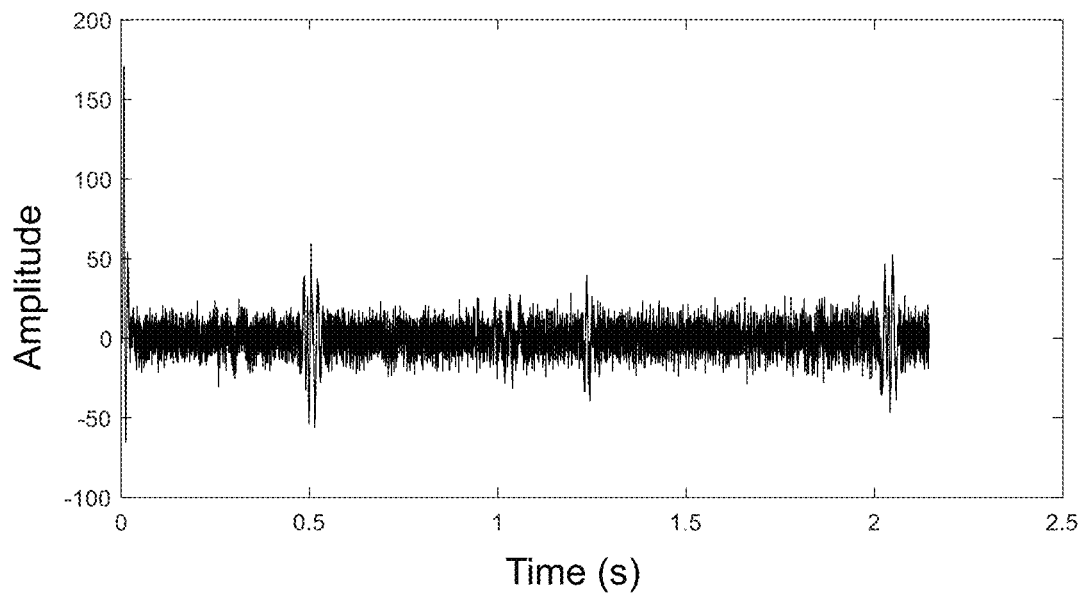
FIG. 20 is a schematic diagram illustrating an exemplary un-denoised carotid negative blood flow audio signal according to some embodiments of the present disclosure.
Figure 21:
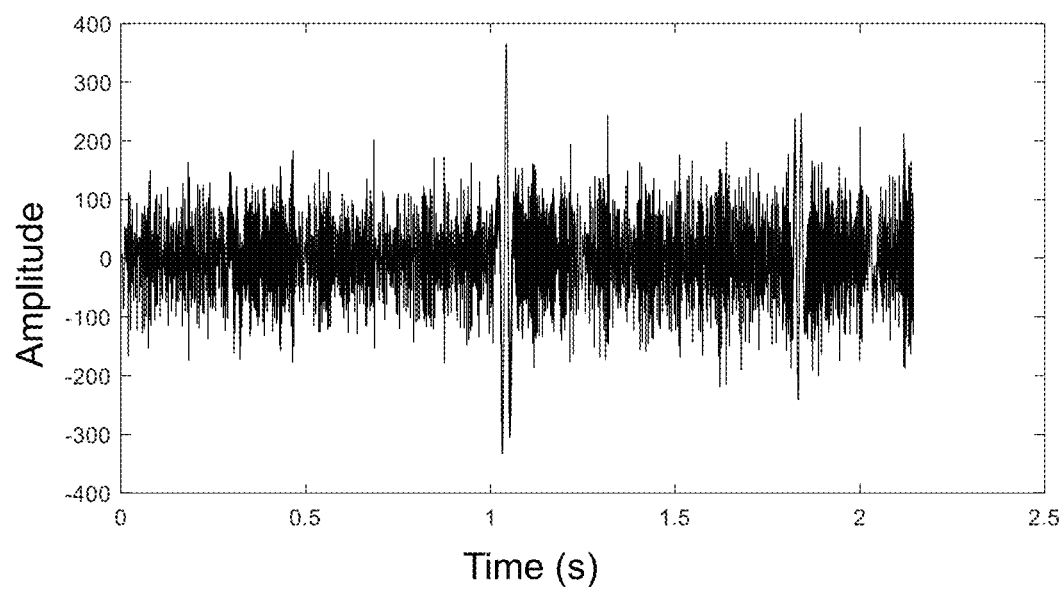
FIG. 21 is a schematic diagram illustrating an exemplary carotid artery positive blood flow audio signal after denoising according to some embodiments of the present disclosure.
Figure 22:
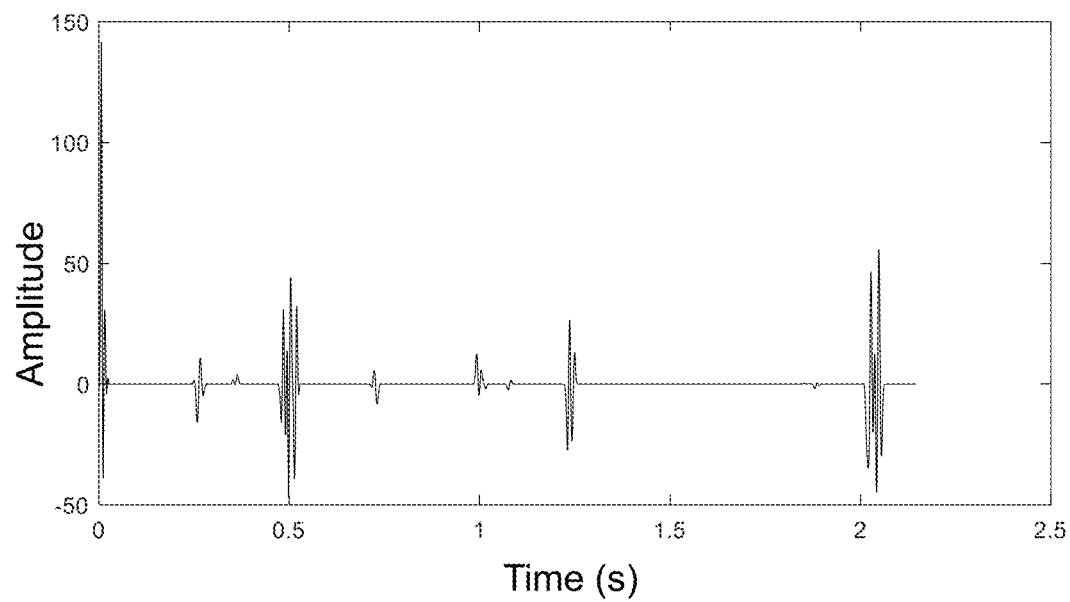
FIG. 22 is a schematic diagram illustrating an exemplary carotid artery negative blood flow audio signal after denoising according to some embodiments of the present disclosure.

To further illustrate the effectiveness of the technical solutions disclosed in the present disclosure, a medical Doppler ultrasound is used to detect a carotid artery blood flow. A blood flow schematic diagram is as shown in FIG. 18. FIG. 18 is a schematic diagram illustrating an exemplary image of a carotid artery blood flow according to some embodiments of the present disclosure. It can be seen from the blood flow image that the blood flow direction is almost entirely positive, so that theoretically the negative blood flow is almost zero. However, an audio corresponding to the negative blood flow is still noisy due to the presence of the background noise, as shown in FIG. 20. FIG. 20 is a schematic diagram illustrating an exemplary un-denoised carotid negative blood flow audio signal according to some embodiments of the present disclosure. FIG. 19 is a schematic diagram illustrating an exemplary un-denoised carotid positive blood flow audio signal according to some embodiments of the present disclosure. Using the signal processing method disclosed herein, the blood flow audio signal is obtained as shown in FIG. 21 and FIG. 22. FIG. 21 is a schematic diagram illustrating an exemplary carotid artery positive blood flow audio signal after denoising according to some embodiments of the present disclosure. FIG. 22 is a schematic diagram illustrating an exemplary carotid artery negative blood flow audio signal after denoising according to some embodiments of the present disclosure. Comparing FIG. 20 and FIG. 22, it can be seen that there is essentially no background noise in the negative blood flow audio signal shown in FIG. 22. At the same time, comparing FIG. 19 and FIG. 21, it can be seen that the denoising process preserves the positive blood flow audio signal very well. As shown above, the signal processing algorithm proposed in some embodiments of the present disclosure can retain useful information while effectively suppressing audio background noise.

Figure 11:
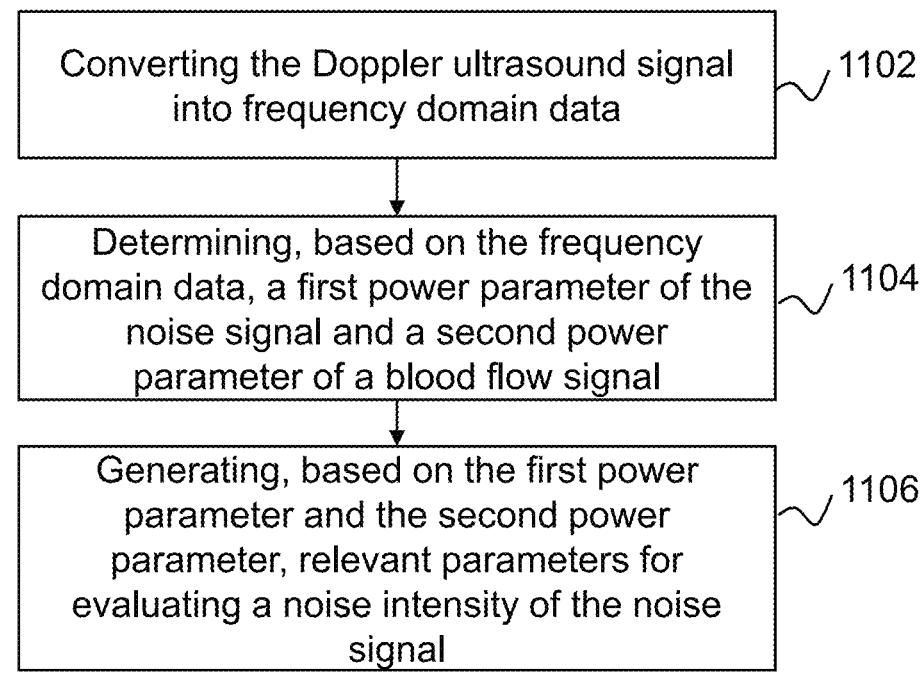
FIG. 11 is a flowchart illustrating an exemplary process for generating a relevant parameter for evaluating the noise intensity of a noisy signal according to some embodiments of the present disclosure.

FIG. 11 is a flowchart illustrating an exemplary process for generating a relevant parameter for evaluating the noise intensity of a noisy signal according to some embodiments of the present disclosure. In some embodiments, the process 1100 may be executed by the processing device. For example, the process 1100 may be stored in a storage device (e.g., a self-contained storage unit of the processing device or an external storage device) in the form of a program or instructions, and the program or instructions, when executed, may implement the process 1100. As shown in FIG. 11, the process 1100 may include the following operations.

In step 1102, the Doppler ultrasound signal may be converted into frequency domain data.

In some embodiments, the processing device may convert the Doppler ultrasound signal into the frequency domain data by performing the short-time Fourier transform on the Doppler ultrasound signal. A count of data of the short-time Fourier transform may be the same as a window size of the selected window function.

In step 1104, a first power parameter of the noise signal and a second power parameter of a blood flow signal may be determined based on the frequency domain data.

The first power parameter of the noise signal may refer to an average power in the frequency domain, and the second power parameter of the noise signal may be a maximum power in the frequency domain.

In step 1106, relevant parameters for evaluating a noise intensity of the noise signal may be generated based on the first power parameter and the second power parameter.

The relevant parameters for evaluating the noise intensity of the noise signal may be understood as those related to the power of the noise signal.

In some embodiments, the parameters related to the power of the noise signal are values of a target function, and the first power parameter and the second power parameter are two variables of the target function. The present disclosure does not limit the specific form of the target function, for example, the target function may be a ratio of variable X to variable Y, with variable X corresponding to the first power parameter and variable Y corresponding to the second power parameter, etc. That is, the relevant parameters for evaluating the noise intensity of the noise signal may be a ratio of the first power parameter to the second power parameter.

In some embodiments, the relevant parameters for evaluating the noise intensity of the noise signal may also be a deviation, a squared deviation, an average squared deviation, etc., of the first power parameter and the second power parameter, which is not limited by the present disclosure.

For more information about the power parameter, the short-time Fourier transform, please refer to FIG. 10 and their related descriptions, which are not repeated here.

FIG. 12 is a flowchart illustrating an exemplary process for generating a blood flow audio signal according to some embodiments of the present disclosure. In some embodiments, the process 1200 may be executed by the processing device. For example, the process 1200 may be stored in a storage device (e.g., the processing device's own storage unit or an external storage device) in the form of a program or instruction, and the program or instruction, when executed, may implement the process 1200. As shown in FIG. 12, the process 1200 may include the following operations.

In step 1202, the frequency domain data after the noise reduction may be divided into a positive frequency portion and a negative frequency portion.

In some embodiments, the processing device may divide the frequency domain data after the noise reduction into the positive frequency portion and the negative frequency portion based on a common frequency domain data splitting method, which may be further described by referring to the existing related contents and is not repeated here.

In step 1204, a positive blood flow audio signal corresponding to a positive blood flow in a blood flow signal of the user may be generated by converting the positive frequency portion into a time domain signal.

After dividing the frequency domain data after the noise reduction into the positive frequency portion and the negative frequency portion, the processing device may take conjugates of the positive frequency portion and the negative frequency portion, respectively, and re-obtain the positive and negative frequency portions; the processing device may perform the inverse Fourier transform on the positive frequency portion and multiply it by the window function to convert it into a time domain signal. The processing device may accumulate the time domain signal corresponding to the positive frequency portion by moving the window function window in steps to obtain the positive blood flow audio signal corresponding to the positive blood flow in the blood flow signal of the user.

In step 1206, a negative blood flow audio signal corresponding to a negative blood flow in the blood flow signal of the user may be generated by converting the negative frequency portion into the time domain signal.

The negative blood flow audio signal may be generated in the same way as the positive blood flow audio signal.

For more information about the specific manner of execution involved in each step of FIG. 12, please refer to FIG. 10 and its related description, which is not repeated here.

Figure 13:
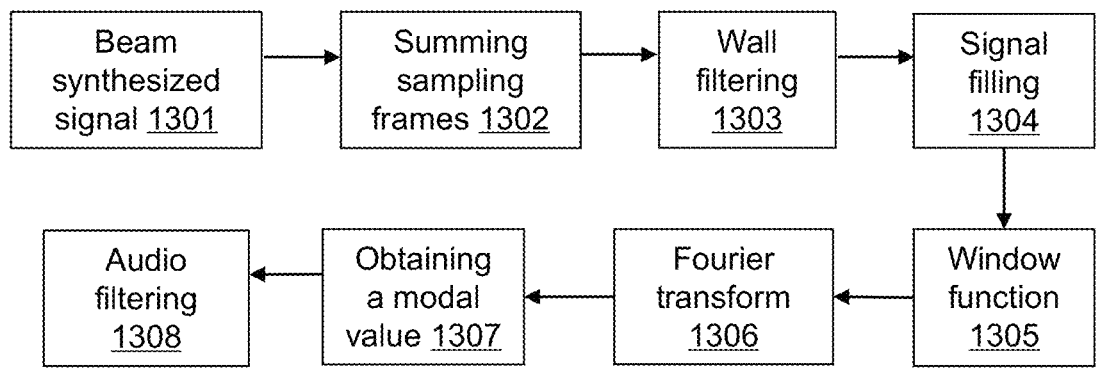
FIG. 13 is a flowchart illustrating an exemplary signal processing process according to some other embodiments of the present disclosure.

FIG. 13 is a flowchart illustrating an exemplary signal processing method according to some other embodiments of the present disclosure In step 1301, a beam synthesized signal may be obtained.

The processing device may perform a beam synthesis by receiving an ultrasonic echo signal returned from the user's tissue to obtain the beam synthesized signal.

In step 1302, sampling frames may be summed.

The sampling frame may be configured to obtain the desired beam synthesis signal. The summation may be done by superimposing multiple beam synthesized signals in the sampling frame by some mathematical process to superimpose the ultrasonic echo signals sampled at all times.

In step 1303, a wall filtering may be performed.

The processing device may perform a wall filtering process on the summed signal, and after the wall filtering process, the Doppler ultrasound signal is obtained. The wall filtering may be understood as a convolution operation of the summed signal. The wall filtering may be performed by a wall filter, and the present disclosure does not limit a type of the wall filter. By the wall filtering, a low frequency signal can be filtered out of the signal and a high frequency signal may be retained, because the vessel wall vibrates very slowly and the low frequency signal may be considered to be generated by the vibration of the vessel wall, and this part of the signal may be considered to be a non-blood flow signal.

In step 1304, a signal filling may be performed.

For the Doppler ultrasound signal obtained in the multi-synchronization mode, the processing device may perform the signal filling. For more information about the specific manner of the signal filling, please refer to FIGS. 2 to 8 of the present disclosure.

In step 1305, a window function may be applied.

The processing device may select a suitable window function to multiply with the obtained Doppler ultrasound signal and obtain different segments of the signal by a sliding window function (as shown in FIG. 2).

In step 1306, a Fourier transform may be performed.

The Fourier transform of each Doppler ultrasound signal is performed on each segment to obtain the frequency domain signal.

In step 1307, a modal value may be obtained.

A phase and an amplitude (modal value) of the signal in the frequency domain are extracted respectively.

In step 1308, an audio filtering may be performed.

The audio filtering is also known as an audio noise reduction. The filtering process may be described in FIGS. 10 to 11 of the present disclosure and is not repeated here.

For the filtered signal, the processing device may multiply the filtered signal and the phase, and multiply the negative and positive frequency signals by the inverse Fourier transform, respectively, and then by the window function (at this time, the window function is the same as the window function after the wall filtering) to superimpose different segments of the signal, and finally output a left sound channel and a right sound channel. Here the left and right sound channels correspond to the positive blood flow (positive frequency) and the negative blood flow (negative frequency), respectively.

In some embodiments, the processing device may also perform a logarithmic compression on the modal value, and then perform an image smoothing, a dynamic range, an automatic envelope, and other processing to generate a blood flow image.

For more information about process 1300, please refer to FIGS. 2 to 12 of the present disclosure, which is not repeated here.

It should be noted that the above description of each is for example and illustration purposes only and does not limit the scope of application of the present disclosure. For those skilled in the art, various amendments and changes can be made to the respective processes under the guidance of the present disclosure. However, these amendments and changes are still within the scope of the present disclosure. For example, changes to the relevant process steps of the present disclosure, such as the addition of a pre-processing step and a storage step, etc.

Figure 14:
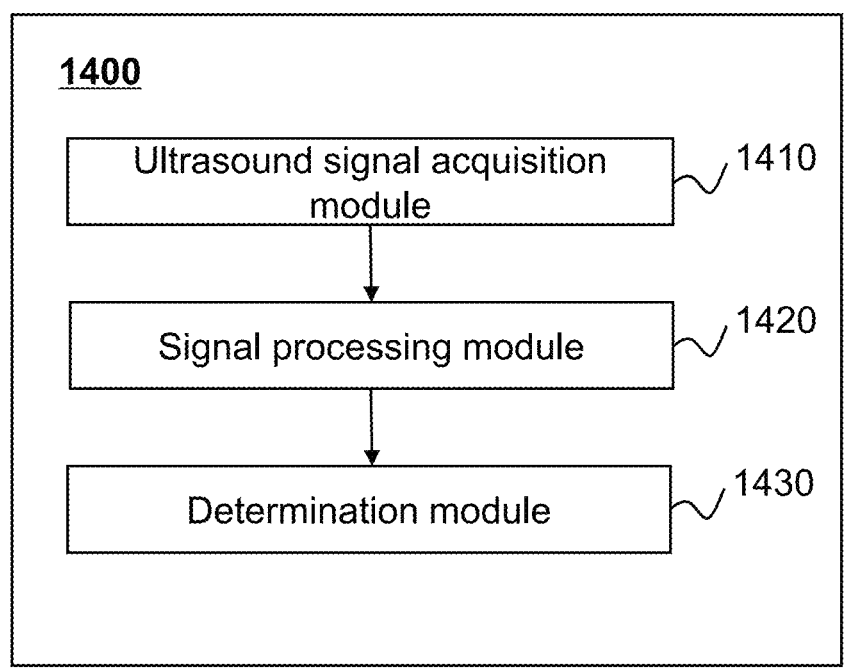
FIG. 14 is a module diagram illustrating an exemplary signal processing system according to some embodiments of the present disclosure.

FIG. 14 is a module diagram illustrating an exemplary signal processing system according to some embodiments of the present disclosure. As shown in FIG. 14, the system 1400 may include an ultrasound signal acquisition module 1410, a signal processing module 1420, and a determination module 1430.

The ultrasound signal acquisition module 1410 may be configured to obtain a Doppler ultrasound signal.

The signal processing module 1420 may be configured to convert two adjacent groups of ultrasound signals in the Doppler ultrasound signal into frequency domain signals and to fill in missing ultrasound signals in a preset time period based on the frequency domain signals.

The preset time period is an acquisition time interval between the two adjacent groups of ultrasound signals.

The determination module 1430 may be configured to determine a target Doppler ultrasound signal based on a result of the signal filling.

In some embodiments, the system may further include: a segmentation processing module and a noise reduction processing module. The segmentation processing module may be configured to segment the Doppler ultrasound signal; the noise reduction processing module may be configured to perform a noise reduction process on each segment of the Doppler ultrasound signal based on a parameter related to a power of the noise signal corresponding to each segment of the Doppler ultrasound signal.

For more information about the above system modules, please refer to the corresponding process sections of the present disclosure, for example, the relevant descriptions in FIGS. 2 to 13, which are not repeated here.

It should be understood that the system and its modules shown in FIG. 14 can be implemented using a variety of means. For example, in some embodiments, the system and its modules may be implemented by hardware, software, or a combination of software and hardware. The hardware portion may be implemented using dedicated logic; the software portion may be stored in a storage and executed by an appropriate instruction execution system, such as a microprocessor or dedicated design hardware. Those skilled in the art can understand that the methods and systems described above can be implemented using computer-executable instructions and/or contained in processor control codes, such as those provided on carrier media such as disks, CDs or DVD-ROMs, programmable memories such as read-only memories (firmware), or data carriers such as optical or electronic signal carriers. The system and its modules of the present disclosure can be implemented not only with hardware circuits such as ultra-large scale integrated circuits or gate arrays, semiconductors such as logic chips, transistors, etc., or programmable hardware devices such as field programmable gate arrays, programmable logic devices, etc. They can also be implemented with software executed, for example, by various types of processors, and can also be implemented by a combination of the above hardware circuitry and software (e.g., firmware).

It should be noted that the above description of the signal processing system and its modules is for descriptive convenience only and does not limit the present disclosure to the scope of the embodiments cited. It can be understood that for those skilled in the art, after understanding the principle of the system, it may be possible to make any combination of individual modules or form subsystems to connect with other modules without departing from this principle. For example, in some embodiments, the ultrasound signal acquisition module 1410, the signal processing module 1420, and the determination module 1430 may be different modules in a single system, or one module may implement the functions of two or more of the above modules. For example, the modules may share a common memory module, and each module may also have its own memory module. Variations such as these are within the scope of protection of the present disclosure.

It should be noted that different embodiments may produce different beneficial effects, and in different embodiments, the possible beneficial effects may be any one or a combination of the above, or any other beneficial effect that may be obtained.

The basic concepts have been described above, apparently, in detail, as will be described above, and does not constitute limitations of the disclosure. Although there is no clear explanation here, those skilled in the art may make various modifications, improvements, and modifications of present disclosure. This type of modification, improvement, and corrections are recommended in present disclosure, so the modification, improvement, and the amendment remain in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Further, it can be understood by those skilled in the art that aspects of the present disclosure can be illustrated and described by a number of patentable categories or situations, including any new and useful combination of processes, machines, products, or substances, or any new and useful improvements to them. Accordingly, aspects of the present disclosure may be performed entirely by hardware, may be performed entirely by software (including firmware, resident software, microcode, etc.), or may be performed by a combination of hardware and software. Each of the above hardware or software may be referred to as a "data block", "module", "engine", "unit", "component", or "system". In addition, aspects of the present disclosure may be represented as a computer product located in one or more computer-readable media, which includes computer-readable program code.

The computer storage medium may contain a propagated data signal with a computer program encoded within it, for example on a baseband or as part of a carrier wave. The propagation signal may have a variety of manifestations, including an electromagnetic form, an optical form, or the like, or a suitable combination. The computer storage medium may be any computer-readable medium other than a computer-readable storage medium that may be connected to an instruction execution system, device, or apparatus to enable communication, propagation, or transmission of a program for use. The program code located on the computer storage medium may be transmitted via any suitable medium, including a radio, a cable, a fiber optic cable, an RF, or similar medium, or any combination of the foregoing.

The computer program code required for the operation of each part of the present disclosure may be written in any one or more programming languages, including object-oriented programming languages such as Java, Scala, Smalltalk, Eiffel, JADE, Emerald, C++, C#, VB. Regular procedural programming languages such as C, Visual Basic, Fortran 2003, Perl, COBOL 2002, PHP, ABAP, dynamic programming languages such as Python, Ruby and Groovy, or other programming languages. The program code may run entirely on the user's computer, or as a stand-alone package on the user's computer, or partly on the user's computer and partly on a remote computer, or entirely on a remote computer or server. In the latter case, the remote computer may be connected to the user's computer via any form of network, such as a local area network (LAN) or wide area network (WAN), or connected to an external computer (e.g., via the Internet), or in a cloud computing environment, or used as a service such as software as a service (SaaS).

Moreover, unless the claims are clearly stated, the sequence of the present disclosure, the use of the digital letters, or the use of other names is not configured to define the order of the present disclosure processes and methods. Although some examples of the disclosure currently considered useful in the present disclosure are discussed in the above disclosure, it should be understood that the details will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only scheme, e.g., an installation on an existing server or mobile device.

Similarly, it should be noted that in order to simplify the expression disclosed in the present disclosure and help the understanding of one or more embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately", "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. A signal processing method, comprising:
   obtaining a Doppler ultrasound signal;
   converting two adjacent groups of ultrasound signals of the Doppler ultrasound signal into frequency domain signals, and obtaining a result of the signal filling by filling missing ultrasound signals in a preset time period based on the frequency domain signals, the preset time period being an acquisition time interval of the two adjacent groups of ultrasound signals, the converting the two adjacent groups of ultrasound signals of the Doppler ultrasound signal into the frequency domain signals, and obtaining the result of the signal filling by filling the missing ultrasound signals in the preset time period based on the frequency domain signals including:
      obtaining, based on the Doppler ultrasound signal, two adjacent groups of first ultrasound signals;
      converting the two adjacent groups of first ultrasound signals into second ultrasound signals, the second ultrasound signals being the frequency domain signals;
      obtaining interpolation processed second ultrasound signals by performing an interpolation process based on the second ultrasound signals;
      obtaining an interpolation result by converting the interpolation processed second ultrasound signals into time domain signals; and
      filling the missing ultrasound signals in the preset time period based on the interpolation result; and
   determining a target Doppler ultrasound signal based on the result of the signal filling.

2. The signal processing method of claim 1, wherein the obtaining the interpolation result includes:
   obtaining a frequency range of the second ultrasound signals, wherein the frequency range includes a first count of multiple initial frequency points, and each initial frequency point of the multiple initial frequency points has a corresponding value;
   determining a second count of multiple target frequency points by performing an aliquot process of the frequency range of the second ultrasound signals based on a count of missing data points of the two adjacent groups of ultrasound signals of the Doppler ultrasound signals;
   determining values corresponding to the second count of multiple target frequency points based on a mapping relationship between values and frequencies; and
   determining interpolated frequency domain data based on the values corresponding to the second count of multiple target frequency points.

3. The signal processing method of claim 2, wherein the signal processing method further includes:
   generating the interpolation result by performing an inverse transformation of the interpolated frequency domain data.

4. The signal processing method of claim 2, wherein the filling the missing ultrasound signals in the preset time period based on the interpolation result includes:
   extracting first N+M data points of the interpolation result, wherein the interpolation result includes 2N+M data points, 2N corresponding to the first count and 2N+M corresponding to the second count; and
   replacing a first group ultrasound signals of the two adjacent groups of first ultrasound signals and the missing ultrasound signals using the first N+M data points.

5. The signal processing method of claim 1, wherein the converting the two adjacent groups of first ultrasound signals into the second ultrasound signals includes:
   determining windowed first ultrasound signals by applying a first window function to the two adjacent groups of first ultrasound signals; and
   obtaining the second ultrasound signals by converting the windowed first ultrasound signals using a preset conversion algorithm.

6. The signal processing method of claim 1, wherein the signal processing method further includes:
   obtaining a plurality of segments by performing a segmentation process on the target Doppler ultrasound signal;
   for each segment of the plurality of segments, performing a noise reduction process based on a parameter related to a power of a noise signal corresponding to the segment.

7. The signal processing method of claim 6, wherein for each segment of the plurality of segments, performing the noise reduction process based on the parameter related to the power of the noise signal corresponding to the segment includes:
   extracting the parameter related to the power of the noise signal; and
   selecting, based on a value of the parameter, a target noise reduction algorithm from at least two preset noise reduction algorithms to perform the noise reduction process for the each segment.

8. The signal processing method of claim 7, wherein the performing the segmentation process on the target Doppler ultrasound signal includes:
   obtaining a segment of the Doppler ultrasound signal corresponding to each time period by applying a second window function at different time periods of the Doppler ultrasound signal.

9. The signal processing method of claim 7, wherein the extracting the parameter related to the power of the noise signal includes:
   converting the Doppler ultrasound signal into frequency domain data;
   determining, based on the frequency domain data, a first power parameter of the noise signal and a second power parameter of a blood flow signal; and generating, based on the first power parameter and the second power parameter, relevant parameters for evaluating a noise intensity of the noise signal.

10. The signal processing method of claim 9, wherein the first power parameter is an average power in a frequency domain, the second power parameter is a maximum power in the frequency domain, the parameter related to the power of the noise signal is a value of a target function, and the first power parameter and the second power parameter are two variables of the target function.

11. The signal processing method of claim 9, wherein the selecting, based on values of the parameter, the target noise reduction algorithm from at least two preset noise reduction algorithms to perform the noise reduction process for the each segment includes:
 in response to determining that a value of the relevant parameters for evaluating the noise intensity of the noise signal is greater than a threshold, selecting a first noise reduction algorithm; and
 in response to determining the value of the relevant parameters is less than or equal to the threshold, selecting a second noise reduction algorithm, the second noise reduction algorithm and the first noise reduction algorithm including at least one different noise reduction parameter.

12. The signal processing method of claim 11, wherein the first noise reduction algorithm and the second noise reduction algorithm are configured to remove the first power parameter of a different weight from the frequency domain data, respectively.

13. The signal processing method of claim 8, wherein the signal processing method further includes:
 generating an audio signal corresponding to a blood flow signal of the user by synthesizing each segment of the plurality of segments of the Doppler ultrasound signal after performing the noise reduction process.

14. A signal processing system, comprising:
 at least one storage device including a set of instructions; and
 at least one processor in communication with the at least one storage device, wherein when executing the set of instructions, the at least one processor is directed to cause the system to perform operations including:
  obtaining a Doppler ultrasound signal;
  converting two adjacent groups of ultrasound signals of the Doppler ultrasound signal into frequency domain signals, and obtaining a result of the signal filling by filling missing ultrasound signals in a preset time period based on the frequency domain signals, the preset time period being an acquisition time interval of the two adjacent groups of ultrasound signals, the converting the two adjacent groups of ultrasound signals of the Doppler ultrasound signal into the frequency domain signals, and obtaining the result of the signal filling by filling the missing ultrasound signals in the preset time period based on the frequency domain signals including:
   obtaining, based on the Doppler ultrasound signal, two adjacent groups of first ultrasound signals;
   converting the two adjacent groups of first ultrasound signals into second ultrasound signals, the second ultrasound signals being the frequency domain signals:
   obtaining interpolation processed second ultrasound signals by performing an interpolation process based on the second ultrasound signals;
   obtaining an interpolation result by converting the interpolation processed second ultrasound signals into time domain signals; and
   filling the missing ultrasound signals in the preset time period based on the interpolation result; and
  determining a target Doppler ultrasound signal based on the result of the signal filling.

15. The signal processing system of claim 14, wherein the converting the two adjacent groups of first ultrasound signals into the second ultrasound signals includes:
 determining windowed first ultrasound signals by applying a first window function to the two adjacent groups of first ultrasound signals; and
 obtaining the second ultrasound signals by converting the windowed first ultrasound signals using a preset conversion algorithm.

16. The signal processing system of claim 14, wherein the operations further include:
 obtaining a plurality of segments by performing a segmentation process on the target Doppler ultrasound signal;
 for each segment of the plurality of segments, performing a noise reduction process based on a parameter related to a power of a noise signal corresponding to the segment.

17. The signal processing system of claim 16, wherein for each segment of the plurality of segments, performing the noise reduction process based on the parameter related to the power of the noise signal corresponding to the segment includes:
 extracting the parameter related to the power of the noise signal; and
 selecting, based on a value of the parameter, a target noise reduction algorithm from at least two preset noise reduction algorithms to perform the noise reduction process for the each segment.

18. A non-transitory computer readable medium, comprising executable instructions that, when executed by at least one processor, direct the at least one processor to perform a method, the method comprising:
 obtaining a Doppler ultrasound signal;
 converting two adjacent groups of ultrasound signals of the Doppler ultrasound signal into frequency domain signals, and obtaining a result of the signal filling by filling missing ultrasound signals in a preset time period based on the frequency domain signals, the preset time period being an acquisition time interval of the two adjacent groups of ultrasound signals, the converting the two adjacent groups of ultrasound signals of the Doppler ultrasound signal into the frequency domain signals, and obtaining the result of the signal filling by filling the missing ultrasound signals in the preset time period based on the frequency domain signals including:
  obtaining, based on the Doppler ultrasound signal, two adjacent groups of first ultrasound signals;
  converting the two adjacent groups of first ultrasound signals into second ultrasound signals, the second ultrasound signals being the frequency domain signals;
  obtaining interpolation processed second ultrasound signals by performing an interpolation process based on the second ultrasound signals;
  obtaining an interpolation result by converting the interpolation processed second ultrasound signals into time domain signals; and filling the missing ultrasound signals in the preset time period based on the interpolation result; and determining a target Doppler ultrasound signal based on the result of the signal filling.

* * * * *